United States Patent
Ishida et al.

(10) Patent No.: US 6,832,048 B2
(45) Date of Patent: Dec. 14, 2004

(54) DISPERSION COMPENSATION APPARATUS AND A DISPERSION COMPENSATION SYSTEM

(75) Inventors: Kazuyuki Ishida, Tokyo (JP); Katsuhiro Shimizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 183 days.

(21) Appl. No.: 09/782,258

(22) Filed: Feb. 14, 2001

(65) Prior Publication Data

US 2001/0013966 A1 Aug. 16, 2001

Related U.S. Application Data

(63) Continuation of application No. PCT/JP00/03842, filed on Jun. 14, 2000.

(30) Foreign Application Priority Data

Jun. 15, 1999 (JP) .......................................... 11-168847

(51) Int. Cl.⁷ .............................................. H04J 14/02
(52) U.S. Cl. .............................. 398/87; 398/81; 398/82
(58) Field of Search ................................ 359/127, 128, 359/129, 130, 161; 398/82, 84, 87, 79, 81

(56) References Cited

U.S. PATENT DOCUMENTS

| | | | | |
|---|---|---|---|---|
| 5,510,930 A | | 4/1996 | Motoshima et al. ........ 359/341 |
| 5,602,666 A | | 2/1997 | Ishikawa et al. ............ 359/161 |
| 5,612,807 A | | 3/1997 | Ishikawa et al. ............ 359/161 |
| 5,636,046 A | | 6/1997 | Ishikawa et al. ............ 359/161 |
| 5,680,490 A | * | 10/1997 | Cohen et al. ................. 385/24 |
| 5,696,614 A | | 12/1997 | Ishikawa et al. ............ 359/124 |
| 5,852,505 A | * | 12/1998 | Li .................................. 398/58 |
| 6,014,480 A | * | 1/2000 | Baney ........................... 385/24 |
| 6,292,603 B1 | * | 9/2001 | Mizuochi et al. ............ 385/24 |
| 6,434,292 B1 | * | 8/2002 | Kim et al. ..................... 385/24 |

FOREIGN PATENT DOCUMENTS

| | | | |
|---|---|---|---|
| EP | 0667690 | * | 8/1995 |
| JP | 7107069 | | 4/1995 |
| JP | 851411 A | | 2/1996 |
| JP | 9116493 A | | 5/1997 |
| JP | 09191290 | | 7/1997 |
| JP | 1188263 A | | 3/1999 |
| JP | 11289301 A | | 10/1999 |
| JP | 2000165353 | * | 6/2000 |
| WO | 0077957 | | 12/2000 |

* cited by examiner

*Primary Examiner*—Leslie Pascal
(74) *Attorney, Agent, or Firm*—Birch, Stewart, Kolasch & Birch, LLP

(57) ABSTRACT

An AWG (arrayed-waveguide grating/10A) divides input ports ($11A_1$ to $11A_{n+1-1}$) into 1 number of groups, each group comprising m number of input ports, and combines optical signals belonging to each of the groups. For example, the optical signals of wavelengths $\lambda_1$ to $\lambda_m$ are input from the input ports ($11A_1$ to $11A_m$) and output from an output port ($12A_1$) as multiplex light. The multiplex light output in each of the groups in the above manner is input into a wave combination coupler (18A) and output to a transmission line (19A) as multiplex light of the optical signals of the wavelengths $\lambda_1$ to $\lambda_n$.

16 Claims, 15 Drawing Sheets

FIG.14

| INPUT PORT \ OUTPUT PORT | 1 | 2 | 3 | 4 | 5 | 6 | 7 | 8 | 9 | 10 | ... | N |
|---|---|---|---|---|---|---|---|---|---|---|---|---|
| 1 | λ1 | λN | λN-1 | λN-2 | λN-3 | λN-4 | λN-5 | λN-6 | λN-7 | λN-8 | | λ2 |
| 2 | λ2 | λ1 | λN | λN-1 | λN-2 | λN-3 | λN-4 | λN-5 | λN-6 | λN-7 | | λ3 |
| 3 | λ3 | λ2 | λ1 | λN | λN-1 | λN-2 | λN-3 | λN-4 | λN-5 | λN-6 | | λ4 |
| 4 | λ4 | λ3 | λ2 | λ1 | λN | λN-1 | λN-2 | λN-3 | λN-4 | λN-5 | | λ5 |
| 5 | λ5 | λ4 | λ3 | λ2 | λ1 | λN | λN-1 | λN-2 | λN-3 | λN-4 | | λ6 |
| 6 | λ6 | λ5 | λ4 | λ3 | λ2 | λ1 | λN | λN-1 | λN-2 | λN-3 | | λ7 |
| 7 | λ7 | λ6 | λ5 | λ4 | λ3 | λ2 | λ1 | λN | λN-1 | λN-2 | | λ8 |
| 8 | λ8 | λ7 | λ6 | λ5 | λ4 | λ3 | λ2 | λ1 | λN | λN-1 | | λ9 |
| 9 | λ9 | λ8 | λ7 | λ6 | λ5 | λ4 | λ3 | λ2 | λ1 | λN | | λ10 |
| 10 | λ10 | λ9 | λ8 | λ7 | λ6 | λ5 | λ4 | λ3 | λ2 | λ1 | | λ11 |
| 11 | λ11 | λ10 | λ9 | λ8 | λ7 | λ6 | λ5 | λ4 | λ3 | λ2 | | λ12 |
| 12 | λ12 | λ11 | λ10 | λ9 | λ8 | λ7 | λ6 | λ5 | λ4 | λ3 | | λ13 |
| 13 | λ13 | λ12 | λ11 | λ10 | λ9 | λ8 | λ7 | λ6 | λ5 | λ4 | | λ14 |
| 14 | λ14 | λ13 | λ12 | λ11 | λ10 | λ9 | λ8 | λ7 | λ6 | λ5 | | λ15 |
| 15 | λ15 | λ14 | λ13 | λ12 | λ11 | λ10 | λ9 | λ8 | λ7 | λ6 | | λ16 |
| 16 | λ16 | λ15 | λ14 | λ13 | λ12 | λ11 | λ10 | λ9 | λ8 | λ7 | | λ17 |
| 17 | λ17 | λ16 | λ15 | λ14 | λ13 | λ12 | λ11 | λ10 | λ9 | λ8 | | λ18 |
| 18 | λ18 | λ17 | λ16 | λ15 | λ14 | λ13 | λ12 | λ11 | λ10 | λ9 | | λ19 |
| 19 | λ19 | λ18 | λ17 | λ16 | λ15 | λ14 | λ13 | λ12 | λ11 | λ10 | | λ20 |
| N | λN | λN-1 | λN-2 | λN-3 | λN-4 | λN-5 | λN-6 | λN-7 | λN-8 | λN-9 | | λ1 |

DISPERSION COMPENSATION APPARATUS AND A DISPERSION COMPENSATION SYSTEM

This application is a Continuation of PCT International Application No. PCT/JP00/03842 filed on Jun. 14, 2000, which designated the United States, and on which priority is claimed under 35 U.S.C. § 120, the entire contents of which are hereby incorporated by reference.

TECHNICAL FIELD

The present invention relates to a dispersion compensation apparatus and a dispersion compensation system which allows a reduction in the crosstalk when waves are multiplexed and demultiplexed in an optical transmission system, particularly in a wavelength multiplexing system.

BACKGROUND ART

It is known that the same medium refracts light of different wavelength differently. That is, velocity of light (to be precise, phase velocity) propagating through a medium depends upon the wavelength of the light. This phenomenon is referred to as dispersion. Dispersion brings a problem when an optical signal is transmitted using an optical fiber in particular or the like.

When transmission is performed in a state where light is confined within a part of a transmission medium like an optical fiber, a propagation velocity of a signal is also different depending on how the light is confined in the transmission medium, what is called a propagation mode (TE, TM, HE, EH, etc.). Propagation velocity differences (hereafter called Mode distribution) due to differences of the propagation modes occur in a multi-mode optical fiber which can propagate signals in a plurality of propagation modes at one wavelength.

On the other hand, a single-mode optical fiber which has only a basic mode as a propagation mode is mainly used for high-speed optical transmission because the mode distribution does not occur. However, in this single-mode optical fiber, the problem on the propagation velocity differences (hereafter called Material dispersion), caused by the fact that the refractive index depends on its wavelength, can not be avoided, so that propagating pulse widths lengthen (pulse distortion) caused by this material dispersion. That is, the dispersion becomes a cause of degradation in a signal waveform due to its transmission even in the single-mode optical fiber.

For example, when a 10 Gb/s-signal is to be transmitted, an allowable dispersion value is about 1000 ps/nm, which corresponds to the amount of dispersion in the single-mode optical fiber of about 70 km. Therefore, dispersion compensation becomes extremely important to perform long-haul transmission. As a device for dispersion compensation, a dispersion compensation fiber, for example, is commercially available. The dispersion compensation fiber is a special optical fiber that compensates for dispersion of a transmission line by inserting any optical fiber, that has a dispersion characteristic of sign opposite to a dispersion value indicating how an optical signal propagating inside the optical fiber is affected thereby, into the transmission line.

In the optical transmission using an optical fiber, it is generally highly efficient and preferable to perform wavelength multiplexing (WDM) transmission in which a transmission band is widened by the number of wavelengths to be used by simultaneously using a line of optical fiber at various wavelengths. The dispersion is a function of a wavelength, and its dispersion value is different in each wavelength. Therefore, in the WDM transmission, when a wavelength-multiplexed optical signal is to be transmitted by a single-mode optical fiber, each wavelength undergoes different dispersion. Therefore, as dispersion compensation for the wavelength-multiplexed optical signal, it is required to discretely compensate for a different dispersion value of each multiplexed wavelength.

With regard to dispersion compensation in such WDM transmission, there have been proposed, for example, "Wavelength multiplex transmission" disclosed in Japanese Patent Laid-Open Publication No. HEI09-116493 and "Wavelength dispersion compensation system for optical transmission line" disclosed in Japanese Patent Laid-Open Publication No. HEI09-191290. These proposals are characterized in that each of the systems comprises a wavelength demultiplexing unit that demultiplexes a wavelength-multiplexed optical signal at each wavelength, and a dispersion compensation unit that independently compensates for wavelength dispersion of an optical signal due to an optical transmission line in each optical signal of demultiplexed wavelengths.

FIG. 11 is a block diagram showing an example of the conventional wavelength dispersion compensation system as disclosed in Japanese Patent Laid-Open Publication No. 09-116493. This figure shows a dispersion compensation system that performs respective dispersion compensation particularly on the following stage of an optical transmitter and the previous stage to an optical receiver.

In the wavelength dispersion compensation system shown in FIG. 11, at first, its transmission side comprises n units of transmitters $101A_1$ to $101A_n$ which oscillate different wavelengths from one another, dispersion compensation sections $102A_1$ to $102A_n$ provided on respective following stages of the transmitters $101A_1$ to $101A_n$ and each of which performs dispersion compensation for a wavelength oscillated by each of the transmitters, and an optical branching/coupling device (coupler) 100A that combines the optical signals transmitted through respective blocks comprising these transmitters $101A_1$ to $101A_n$ and dispersion compensation sections $102A_1$ to $102A_n$. The optical signal combined in this optical branching/coupling device (coupler) 100A is transmitted to a transmission line 109.

On the other hand, its reception side comprises an optical branching/coupling device 100B that demultiplexes (separates) the wavelength into the wavelengths corresponding to those in the optical branching/coupling device 100A, band-pass filters $105B_1$ to $105B_n$ through which predetermined wavelengths pass, dispersion compensation sections $102B_1$ to $102B_n$ which perform dispersion compensation for the wavelengths of the optical signals having passed through the band-pass filters $105B_1$ to $105B_n$, and receivers $101B_1$ to $101B_n$ which receive the optical signals transmitted through respective blocks consisting of these band-pass filters $105B_1$ to $105B_n$ and dispersion compensation sections $102B_1$ to $102B_n$.

In FIG. 11, for example, the transmitter $101A_1$ oscillates a wavelength $\lambda_1$, and the band-pass filter $105B_1$ selectively passes an optical signal of the wavelength $\lambda_1$ therethrough. Accordingly, the dispersion compensation sections $102A_1$ and $102B_1$ perform dispersion compensation only for the optical signal of the wavelength $\lambda_1$. The dispersion compensation sections $102A_1$ and $102B_1$ can use a dispersion compensation fiber having a dispersion value of sign opposite to the dispersion value for the wavelength $\lambda_1$ indicated by the transmission line 109. The above configuration allows compensation for all the wavelengths in the transmitter side and the receiver side of the WDM transmission system so as to become zero dispersion.

FIG. 12 is block diagram showing the invention disclosed in Japanese Patent Laid-Open Publication No. HEI09-191290 as explained above, which is the diagram for explaining particularly a wavelength dispersion compensation system for an optical transmission line in a WDM transmission relay system.

The wavelength dispersion compensation system shown in FIG. 12 comprises transmission lines 119A and 119B which propagate optical signals of wavelengths $\lambda_1$ to $\lambda_n$ multiplexed at n wavelengths, an optical branching/coupling device 110A which demultiplexes (separates) the wavelengths, band-pass filters $115A_1$ to $115A_n$ which pass predetermined wavelengths for optical signals of the separated wavelengths therethrough, dispersion compensation sections $112A_1$ to $112A_n$ which perform dispersion compensation for the wavelengths of the optical signals having passed through the band-pass filters $115A_1$ to $115A_n$, and an optical branching/coupling device (coupler) 110B which combines again the optical signals transmitted through respective blocks consisting of these band-pass filters $115A_1$ to $115A_n$ and dispersion compensation sections $112A_1$ to $112A_n$.

In the wavelength dispersion compensation system shown in FIG. 12, only the wavelength $\lambda_1$ having selectively passed through the band-pass filter $115A_1$ is input into the dispersion compensation section $112A_1$, and this dispersion compensation section $112A_1$ compensates for dispersion with respect to the wavelength $\lambda_1$ affected by the transmission lines 119A and 119B.

As explained above, according to "Wavelength dispersion compensation system for optical transmission line" disclosed in Japanese Patent Laid-Open Publication No. HEI09-191290, wavelength dispersion compensation is performed for a wavelength-multiplexed optical signal at each wavelength of the optical signal, which makes it possible to perform simultaneous and perfect dispersion compensation for the wavelengths of all the optical signals whose wavelength dispersion is different.

Further, as another conventional example, the optical branching/coupling device 110A and the band-pass filters $115A_1$ to $115A_n$ forming a block and the optical branching/coupling device 110B shown in FIG. 12 can also be replaced with arrayed-waveguide gratings (AWG), respectively. FIG. 13 is a block diagram showing the conventional wavelength dispersion compensation system when these AWGs are used.

The wavelength dispersion compensation system shown in FIG. 13 comprises transmission lines 129A and 129B, two AWGs 120A and 120B, and dispersion compensation sections $124A_1$ to $124A_n$ for n wavelengths. The AWG 120A in particular separates an optical signal of a multiplexed wavelength input from an input port $121A_1$ into n wavelengths, and outputs the separated optical signals to output ports $122A_1$ to $122A_n$, respectively.

The AWG 120B inputs the optical signals having passed through the dispersion compensation sections $124A_1$ to $124A_n$ from input ports $122B_1$ to $122B_n$ and also combines the signals to be output from an output port $121B_1$. These AWGs 120A and 120B have periodicity in their operations, and by utilizing this periodicity, optical signals can be combined or separated with their comparatively minimized size and low loss.

FIG. 14 is an explanatory diagram for explaining the periodicity of the AWG, and particularly shows the AWG which comprises input ports and output ports by N number respectively, and can combine or separate N wavelengths. In FIG. 14, when optical signals of wavelengths $\lambda_1$ to $\lambda_N$ are successively input into input ports 1 to N of the AWG, the multiplex light of these $\lambda_1$ to $\lambda_N$ can be obtained at an output port 1. Conversely, the multiplex light of $\lambda_1$ to $\lambda_N$ is input into the output port 1, the optical signals of the wavelengths $\lambda_1$ to $\lambda_N$ can be obtained in order from the input ports 1 to N.

When the optical signals of wavelengths $\lambda_N, \lambda_1$ to $\lambda_{N-1}$ are successively input into the input ports 1 to N of the AWG, the multiplex light of these $\lambda_1$ to $\lambda_N$ can be obtained at an output port 2. Conversely, the multiplexed light of $\lambda_1$ to $\lambda_N$ is input into the output port 2, the optical signals of the wavelengths $\lambda_N, \lambda_1$ to $\lambda_{N-1}$ can be obtained in order from the input ports 1 to N.

As explained above, the AWG generally has reversibility to input/output of optical signals to/from a plurality of input/output ports, and also has a certain relation, like the periodicity, between wavelengths of the optical signals input into the input ports and the output port which combines the optical signals of these wavelengths and outputs the combined signal. From these characteristics, the AWG makes wave combination and separation possible, and an input/output relations between respective input ports and output ports differs depending on which of the functions, wave combination and separation, the AWG is allowed to perform. In the explanation below, not depending on these functions, but it is assumed that a side to which an optical signal is input is an input port, while a side from which a combined or separated optical signal is output is an output port.

Crosstalk of such an AWG is explained below. The AWG is commonly used as a wave combiner/divider in a current wavelength multiplexing system, but crosstalk between adjacent wavelengths can not be neglected in association with higher density in multiplexing of wavelengths. FIG. 15 is an explanatory diagram for explaining the crosstalk in the AWG.

In FIG. 15, an AWG 140A has N number of input ports $141A_1$ to $141A_N$ and N number of output ports $142A_1$ to $142A_N$ having the periodicity as shown in FIG. 14. For example, when multiplex light of wavelengths $\lambda_1, \lambda_2$, and $\lambda_3$ is input into an input port $141A_3$, the light is separated into the wavelengths $\lambda_3, \lambda_2$, and $\lambda_1$, which are output in order from the output ports $142A_1$ to $142A_3$ based on the periodicity shown in FIG. 14.

As explained above, in the wavelength dispersion compensation system, by applying the AWG to a portion that performs a function of combining and separating optical signals, the dispersion compensation apparatus that performs dispersion compensation, that is, the configuration comprising the dispersion compensation sections $124A_1$ to $124A_n$, the wave combiner (AWG 120A), and the wave divider (AWG 120B) shown in FIG. 13 can be simplified.

As another related conventional example, "LIGHT AMPLIFYING APPARATUS" disclosed in U.S. Pat. No. 5,510,930 stabilizes the operation of an optical amplifier by polarizing pump light to a right-circularly polarized wave and left-circularly polarized wave. "DISPERSION COMPENSATION DEVICE" disclosed in U.S. patent application Ser. No. 207,419 performs efficient dispersion compensation for wavelength-multiplexed light by using a diffraction grating whose both edges have different grating pitches.

In the conventional dispersion compensation apparatus, however, since dispersion compensation is discretely performed for each wavelength, dispersion compensation sections are required by the number of wavelengths to be combined or separated, accordingly, there has been a problem such that the scale of a circuit increases, which makes the circuit complicated and costly.

There has been also a problem such that wavelengths output from adjacent output ports are included as crosstalk in an optical signal output from each of the output ports of the AWGs or the like. For example, as shown in FIG. 15, as an optical signal output from the output port $142A_2$, only an optical signal of a wavelength $\lambda_2$ should originally be output, but wavelengths $\lambda_1$ and $\lambda_3$ output from the output ports $142A_1$ and $142A_3$ adjacent to the output port $142A_2$ are partially included in the optical signal output from the output port $142A_2$. Accordingly, there have been problems such that signal quality is degraded, which exerts a bad effect on transmission characteristics and reception characteristics of the optical transmission system.

It is therefore an object of this invention, in an optical transmission system, to provide a dispersion compensation apparatus which has high-reliability transmission characteristics and reception characteristics and can also achieve minimization of the apparatus and cost reduction, and also to provide a dispersion compensation system.

DISCLOSURE OF THE INVENTION

A dispersion compensation apparatus according to this invention is characterized in that, this dispersion compensation apparatus that performs dispersion compensation in an optical transmission system, the apparatus comprises a first wave combiner which receives a plurality of optical signals having different wavelengths, divides the received optical signals into a plurality of groups, and combines the optical signals included in each of the divided groups to output a first multiplex light corresponding to each of the groups; and a second wave combiner which receives the plurality of first multiplex lights output from the first wave combiner, and combines the first multiplex lights to output a second multiplex light.

According to the invention, when a plurality of optical signals having different wavelengths from each other are input to obtain multiple light of the signals (second multiplex light), at first, the first wave combiner divides the plurality of optical signals into a plurality of groups, and combines the optical signals in each of the divided groups to output the first multiplex light in each of the groups, and then the second wave combiner outputs final multiplex light, therefore, it is possible to perform dispersion compensation and band-passing on the first multiplex lights smaller in number than the number of initially input optical signals, thus it is possible to perform high-reliability optical transmission with a simpler configuration.

A dispersion compensation apparatus according to this invention is characterized in that, in the above explained dispersion compensation apparatus, the first wave combiner has a leakage suppression unit which receives the optical signals in each of the groups and suppresses leakage of optical signals included in adjacent groups.

According to the invention, the first wave combiner has the leakage suppression unit which receives the plurality of optical signals in each of the groups and suppresses leakage (crosstalk or the like) of the optical signals included in the adjacent groups, therefore, it is possible to obtain first multiplex light from which any unnecessary wavelength components have been removed.

A dispersion compensation apparatus according to this invention is characterized in that, in the above dispersion compensation apparatus, the leakage suppression unit has at least one leakage signal output terminal which is provided between output sections for outputting multiplex light in each of the groups, and outputs leakage of the optical signals included in the adjacent groups.

According to the invention, the first wave combiner has the leakage output section which becomes an outlet of the leakage signal as the leakage suppression unit which receives a plurality of optical signals in each group and suppressing leakage (crosstalk or the like) of the optical signals included in the adjacent groups, therefore, it is possible to process any unnecessary wavelength components input from the adjacent groups as ineffective ones.

A dispersion compensation apparatus according to this invention is characterized in that, the above explained dispersion compensation apparatus comprises a dispersion compensation unit which subjects each of the first multiplex lights output from the first wave combiner to compensation for dispersion of predetermined wavelengths.

According to the invention, there are provided the dispersion compensation units which subject the respective first multiplex lights output from the first wave combiner to compensation for dispersion of the predetermined wavelengths, therefore, there is no need to discretely provide the dispersion compensation units such as dispersion compensation fibers for the respective optical signals input into the first wave combiner.

A dispersion compensation apparatus according to this invention is characterized in that, the above explained dispersion compensation apparatus comprises a filter unit provided on the previous stage to the dispersion compensation unit, wherein the filter unit allows only an optical signal of a predetermined wavelength to passes through.

According to the invention, the filter unit such as a band-pass filter, which passes only an optical signal of a predetermined wavelength therethrough, is provided on the previous stage to the dispersion compensation unit, therefore, any unnecessary wavelength components are removed more effectively, thus it is possible to obtain only multiplex light (first multiplex light) within a range of target wavelengths.

A dispersion compensation apparatus according to this invention is characterized in that, in the above explained dispersion compensation apparatus, the first wave combiner is an arrayed-waveguide grating.

According to the invention, the first wave combiner is the arrayed-waveguide grating, therefore, the unit can be produced compactly as a part of a planar lightwave circuit.

A dispersion compensation apparatus according to this invention is characterized in that, this dispersion compensation apparatus that performs dispersion compensation in an optical transmission system, the apparatus comprises a first wave divider which receives first multiplex light including a plurality of optical signals having different wavelengths, and separates the input first multiplex light to output a plurality of second multiplex lights; and a second wave divider which receives the second multiplex lights output from the first wave divider, and separates each of the input second multiplex lights to output a plurality of optical signals included in each of the second multiplex lights.

According to the invention, when a plurality of optical signals having different wavelengths from each other included in the multiplex light (first multiplex light) are to be obtained, at first, the first wave divider separates the first multiplex light to output a plurality of second multiplex lights, and the second wave divider outputs a plurality of final optical signals included in each of the second multiplex lights, therefore, it is possible to perform dispersion compensation and band-passing on the second multiplex lights smaller in number than the number of optical signals to be finally output, thus it is possible to perform high-reliability optical transmission with a simpler configuration.

A dispersion compensation apparatus according to this invention is characterized in that, in the above explained dispersion compensation apparatus, the second wave divider has a leakage suppression unit which suppresses leakage of adjacent multiplex lights at the time of inputting the second multiplex lights.

According to the invention, the second wave divider has the leakage suppression unit which receives the first multiplex light and suppressing leakage (crosstalk or the like) of adjacent multiplex lights, therefore, it is possible to obtain second multiplex light from which any unnecessary wavelength components have been removed.

A dispersion compensation apparatus according to this invention is characterized in that, in the above explained dispersion compensation apparatus, the leakage suppression unit has at least one leakage signal output terminal which is provided between output sections for outputting multiplex light in each of the groups, and outputs leakage of the optical signals included in the adjacent groups.

According to the invention, the second wave divider has the leakage output section, which becomes an outlet of the leakage signal, as the leakage suppression unit which receives a plurality of optical signals in each group and suppressing leakage (crosstalk or the like) of the optical signals included in the adjacent groups, therefore, it is possible to process any unnecessary wavelength components input from the adjacent groups as ineffective ones.

A dispersion compensation apparatus according to this invention is characterized in that, the above explained dispersion compensation apparatus comprises a dispersion compensation unit which subjects each of the second multiplex lights output from the first wave divider to compensation for dispersion of predetermined wavelengths.

According to the invention, there are provided the dispersion compensation units which subject the respective second multiplex lights output from the first wave divider to compensation for dispersion of the predetermined wavelengths, therefore, there is no need to discretely provide the dispersion compensation units such as dispersion compensation fibers for the respective optical signals to be finally output from the second wave divider.

A dispersion compensation apparatus according to this invention is characterized in that, the above explained dispersion compensation apparatus comprises a filter unit provided on the previous stage to the dispersion compensation unit, wherein the filter unit allows only an optical signal of a predetermined wavelength to passes through.

According to the invention, the filter unit such as a band-pass filter, which passes only an optical signal of a predetermined wavelength therethrough, is provided on the previous stage to the dispersion compensation unit, therefore, any unnecessary wavelength components are removed more effectively, thus it is possible to obtain only multiplex light (second multiplex light) within a range of target wavelengths.

A dispersion compensation apparatus according to this invention is characterized in that, in the above explained dispersion compensation apparatus, the second wave divider is an arrayed-waveguide grating.

According to the invention, the second wave divider is the arrayed-waveguide grating, therefore, the unit can be produced compactly as a part of a planar lightwave circuit.

A dispersion compensation apparatus according to this invention is characterized in that, this dispersion compensation apparatus that performs dispersion compensation in an optical transmission system, the apparatus comprises a wave combiner/divider which receives a plurality of optical signals having different wavelengths, divides the input optical signals into a plurality of first groups, combines the optical signals included in each of the first groups to be output as first multiplex light, receives a plurality of second multiplex lights, and separates each of the input second multiplex lights to output a plurality of optical signals included in the second multiplex light in each second group, the combiner/divider having input terminals which receives the optical signals of the first groups and output terminals for outputting the optical signals of the second groups, wherein the input terminals and output terminals are arranged alternately and adjacent to each other; and the combiner/divider further having output terminals for outputting the first multiplex light and input terminals which receives the second multiplex light, wherein the input terminals and output terminals are arranged alternately and adjacent to each other.

According to the invention, there is provided the wave combiner/divider which receives a plurality of optical signals having different wavelengths from each other, divides the plurality of input optical signals into a plurality of first groups, combines the optical signals included in each of the first groups to be output as first multiplex light, receives a plurality of second multiplex lights, and separates each of the input second multiplex lights to output a plurality of optical signals included in the second multiplex light in each second group; in which the input sections which receives the optical signals of the first groups and the output sections for outputting the optical signals of the second groups are arranged alternately and adjacent to each other, and also the output sections for outputting the first multiplex light and the input sections which receives the second multiplex lights are arranged alternately and adjacent to each other, therefore, it is possible to concurrently perform transmission of multiplex light formed with a plurality of optical signals and reception of a plurality of optical signals from the multiplex light, and also to perform dispersion compensation and band-passing on the first or the second multiplex lights smaller in number than the number of initially input optical signals or the number of optical signals to be finally output, thus it is possible to perform high-reliability optical transmission with a simpler configuration.

A dispersion compensation apparatus according to this invention is characterized in that, the above explained dispersion compensation apparatus comprises a dispersion compensation unit which subjects each of the first and second multiplex lights to compensation for dispersion of predetermined wavelengths.

According to the invention, there are provided the dispersion compensation units which subject the respective first multiplex lights and second multiplex lights to compensation for dispersion of the predetermined wavelengths, therefore, there is no need to discretely provide the dispersion compensation units such as dispersion compensation fibers for the respective optical signals to be initially input or optical signals to be finally output to or from the wave combiner/divider.

A dispersion compensation apparatus according to this invention is characterized in that, the above explained dispersion compensation apparatus has optical isolators provided on the following stage of the output terminal for outputting the first multiplex light and on the previous stage to the input terminal which receives the second multiplex light, respectively.

According to the invention, the optical isolators are provided on the following stage of the output section for outputting the first multiplex light and the previous stage to the input section which receives the second multiplex light, respectively, therefore, it is possible to prevent optical signals in a reverse direction from being mixed into these output sections and input sections, thus it is possible to ensure the direction of optical signals between the adjacent input/output sections.

A dispersion compensation system according to this invention is characterized in that, in this dispersion compensation system for performing respective dispersion compensation in a transmission unit and a reception unit in an optical transmission system, the above explained dispersion compensation apparatus is provided in the transmission section, and the above explained dispersion compensation apparatus is provided in the reception section.

According to the invention, the dispersion compensation system is constructed by providing the specific dispersion compensation apparatuses in the transmission section and the reception section, therefore, it is possible to enjoy the advantages of the dispersion compensation apparatus which can perform high-reliability optical transmission with a simpler configuration.

A dispersion compensation system according to this invention is characterized in that, in this dispersion compensation system for performing respective dispersion compensation in a transmission unit and a reception unit in an optical transmission system, the above explained dispersion compensation apparatuses are provided in the transmission section and in the reception section, respectively.

According to the invention, the dispersion compensation system is constructed by providing the specific dispersion compensation apparatuses in the transmission section and the reception section respectively, therefore, it is possible to enjoy the advantages of the dispersion compensation apparatus which can perform high-reliability optical transmission with a simpler configuration.

BRIEF DESCRIPTION OF THE DRAWINGS

FIG. 14 is an explanatory diagram for explaining the periodicity of the AWG.

BEST MODE FOR CARRYING OUT THE INVENTION

The embodiments of the dispersion compensation apparatus and the dispersion compensation system according to this invention will be explained in detail below with reference to the drawings. It should be noted that this invention is not limited by the embodiments.

Figure 1:
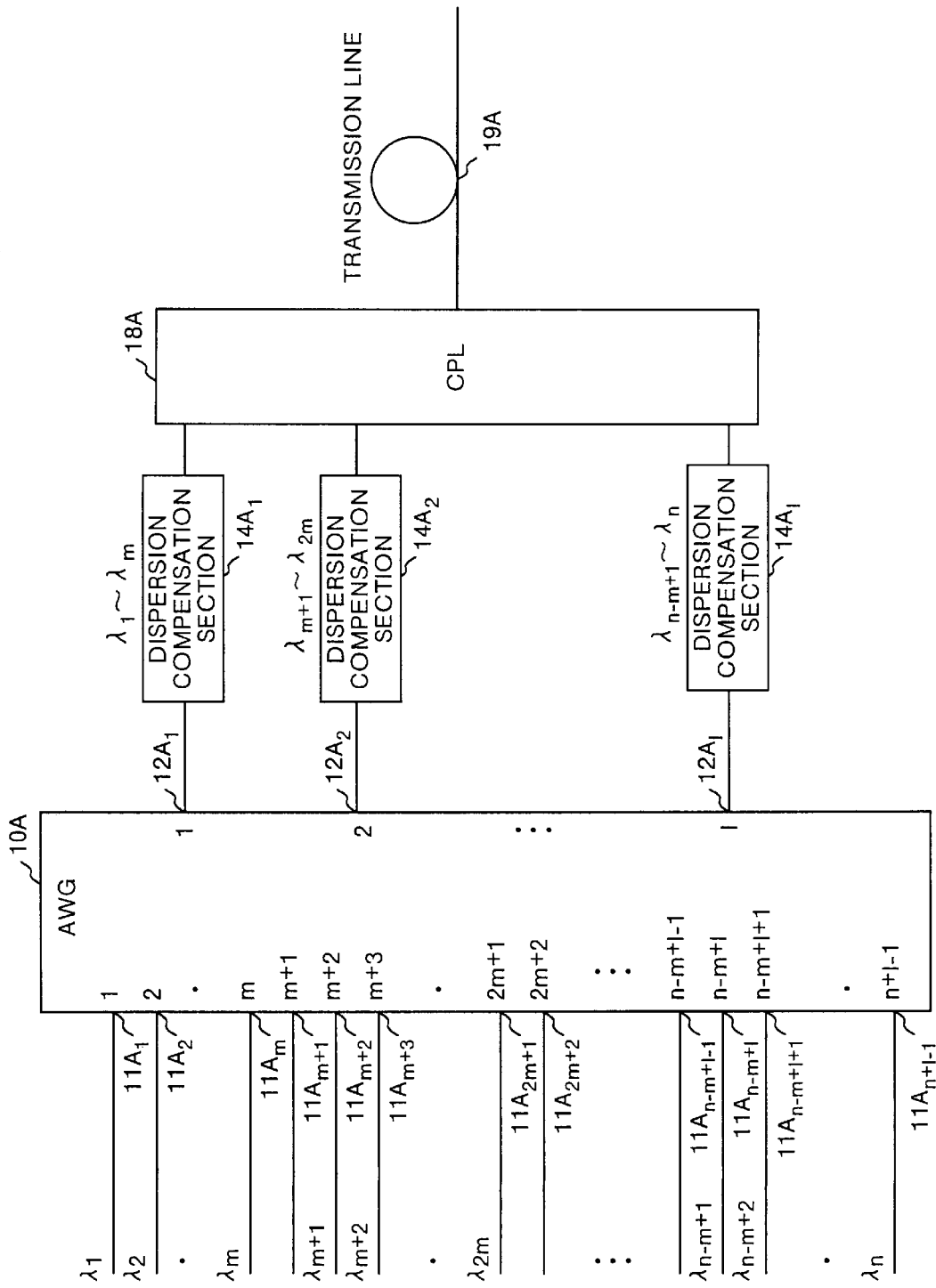
FIG. 1 is a block diagram showing a schematic configuration of a dispersion compensation apparatus according to a first embodiment.

At first, the dispersion compensation apparatus according to the first embodiment is explained. FIG. 1 is a block diagram showing the schematic configuration of the dispersion compensation apparatus according to the first embodiment. The dispersion compensation apparatus shown in FIG. 1 is configured to provide an AWG 10A having n+1−1 number of input ports $11A_1$ to $11A_{n+1-1}$ and 1 number of output ports $12A_1$ to $12A_1$, dispersion compensation sections $14A_1$ to $14A_1$ that perform dispersion compensation for wavelengths of multiplex lights output from the output ports $12A_1$ to $12A_1$ of the AWG 10A, and a wave combination coupler 18A that combines the multiplex lights output from these dispersion compensation sections $14A_1$ to $14A_1$.

In particular, the output ports $12A_1$ to $12A_1$ of the AWG 10A are designed so as to combine optical signals of wavelengths input from at least two ports of the input ports $11A_1$ to $11A_{n+1-1}$. For example, in FIG. 1, the AWG 10A combines optical signals of m number of wavelengths $\lambda_1$ to $\lambda_m$ input into the input ports $11A_1$ to $11A_m$, and outputs the multiplex light obtained through their combination from the output port $12A_1$.

Likewise, the AWG 10A combines optical signals of m number of wavelengths $\lambda_{m+1}$ to $\lambda_{2m}$ input from input ports $11_{Am+2}$ to $11A_{2m+1}$, and outputs multiplex light obtained through their combination from the output port $12A_2$. As explained above, the AWG 10A divides the input ports into a plurality of groups, and combines optical signals in each of the divided groups. In the AWG 10A shown in FIG. 1, the input ports $11A_1$ to $11A_{n+1-1}$ are divided into 1 number of groups so that each of the groups has m number of input ports.

The multiplex lights output from the output ports $12A_1$ to $12A_1$ are further input into the respective dispersion compensation sections $14A_1$ to $14A_1$, and are subjected to dispersion compensation. For example, the multiplex light output from the output port $12A_1$ is input into the dispersion compensation section $14A_1$, and the dispersion compensation section $14A_1$ performs dispersion compensation for the wavelengths $\lambda_1$ to $\lambda_m$. As the dispersion compensation, it is allowed to use the dispersion compensation fiber or a fiber grating, or to use a PLC (planar lightwave circuit) type of device or the like.

The multiplex lights subjected to respective dispersion compensation and output from 1 units of the dispersion compensation sections $14A_1$ to $14A_1$ are input into the wave combination coupler 18A, are further combined in this wave combination coupler 18A, and output to a transmission line 19A. That is, the optical signal whose wavelengths $\lambda_1$ to $\lambda_n$ are multiplexed by the wave combination coupler 18A can be obtained. As the wave combination coupler 18A, for example, a photocoupler or a wavelength multiplexer may be used.

As explained above, the input ports are divided into a plurality of groups, and multiplex light including the optical signals input into the input ports within each of the groups is output from each of the output ports $12A_1$ to $12A_1$ corresponding to the group, therefore, the dispersion compensation sections $14A_1$ to $14A_1$ can be connected to the output ports each specific to each group, which eliminates the need for providing the dispersion compensation sections for respective optical signals of n number of wavelengths input into the input ports, thus it is possible to make simpler the circuit configuration of the overall dispersion compensation apparatus.

Although the dispersion compensation apparatus according to the first embodiment is configured to allow the AWG 10A to function as the firstwave combiner and transmit multiplexed optical signal to the transmission line 19A via the wave combination coupler 18A as the second wave combiner, as explained above, the AWG 10A can perform reverse functions of wave combination and wave separation between the input ports and the output ports, so that the wave combination coupler 18A shown in FIG. 1 is replaced with a wave separation coupler and the AWG 10A is used as a wave divider, thereby the multiplex light input from the transmission line 19A can be separated into the wavelengths $\lambda_1$ to $\lambda_n$ via the wave separation coupler, the dispersion compensation sections $14A_1$ to $14A_1$, and the AWG 10A. It is needless to say that the same effect can be given in this case as well.

As explained above, according to the dispersion compensation apparatus in the first embodiment, optical signals of a plurality of different wavelengths are combined by the first wave combiner formed with the AWG 10A or the like at each of a plurality of wavelengths, respective dispersion compensation is performed on each of the multiplex lights obtained through the wave combination, and the multiplex lights subjected to dispersion compensation are further combined by the second wave combiner formed with the wave combination coupler 18A or the like to be output to the transmission line, therefore, there is no need to provide the dispersion compensation section at each wavelength one to one like in the conventional type, thus it is possible to achieve minimization of the apparatus and cost reduction.

Figure 2:
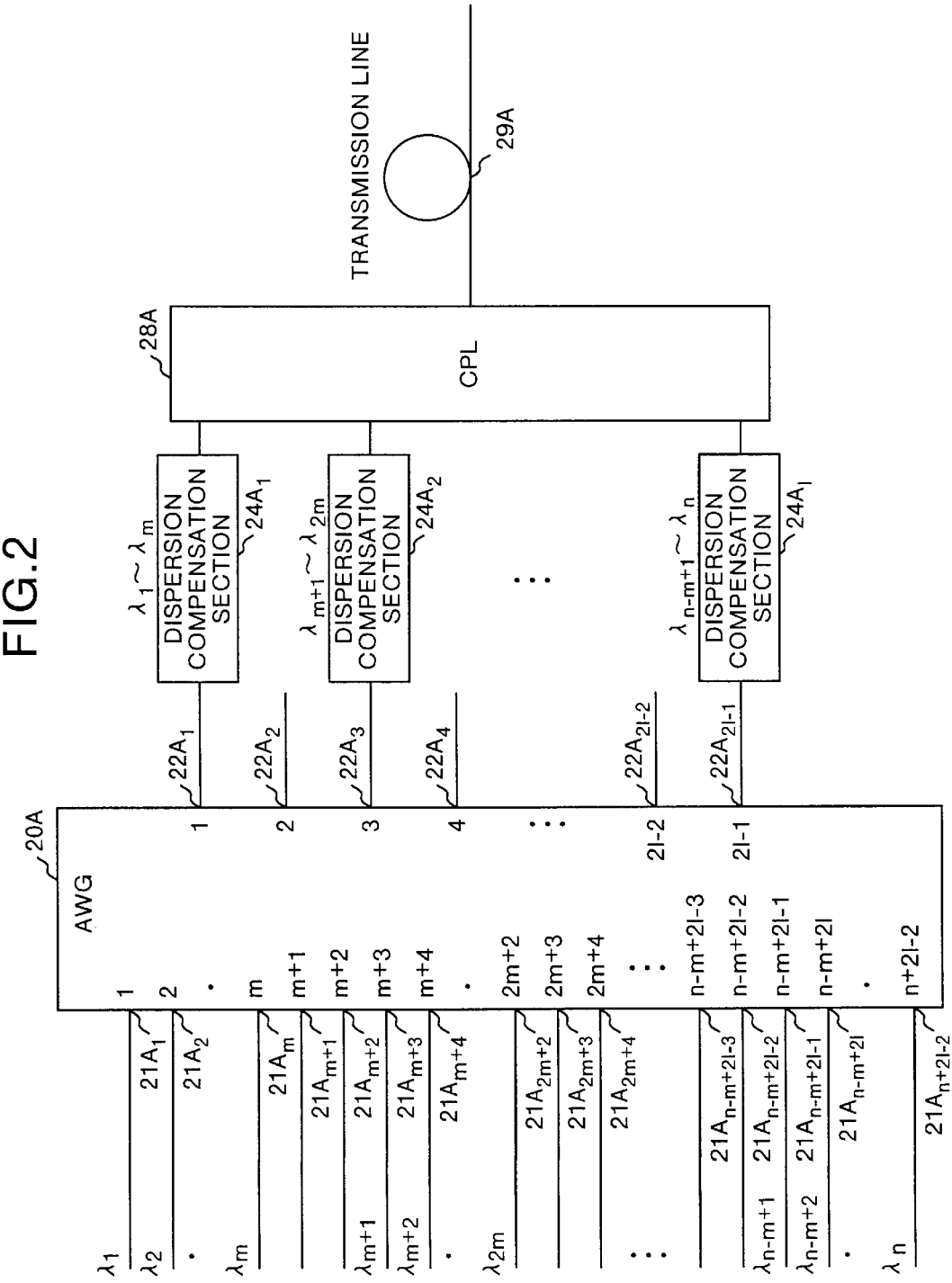
FIG. 2 is a block diagram showing a schematic configuration of a dispersion compensation apparatus according to a second embodiment.

The dispersion compensation apparatus according to the second embodiment is explained below. FIG. 2 is a block diagram showing a schematic configuration of the dispersion compensation apparatus according to the second embodiment. The dispersion compensation apparatus shown in FIG. 2 comprises an AWG 20A having n+21−2 number of input ports $21A_1$ to $21A_{n+21-2}$ and 21−1 number of output ports $22A_1$ to $22A_{21-1}$, dispersion compensation sections $24A_1$ to $24A_1$ that perform dispersion compensation for each wavelength of the multiplex light output from every other output port of the output ports $22A_1$ to $22A_{21-1}$ of the AWG 20A, and a wave combination coupler 28A that combines the multiplex lights output from these dispersion compensation sections $24A_1$ to $24A_1$.

In particular, the output ports $22A_1$ to $12A_{21-1}$ of the AWG 10A are designed so as to combine optical signals of wavelengths input into at least two ports of the input ports $21A_1$ to $11A_{n+21-2}$. For example, in FIG. 2, the AWG 20A combines the optical signals of m number of wavelengths $\lambda_1$ to $\lambda_m$ input into the input ports $21A_1$ to $21A_m$, and outputs the multiplex light obtained through their combination from the output port $22A_1$.

Likewise, the AWG 20A combines the optical signals of m number of wavelengths $\lambda_{m+1}$ to $\lambda_{2m}$ input into the input ports $21A_{m+3}$ to $21A_{2m+2}$, and outputs the multiplex light obtained through their combination from the output port $22A_3$. As explained above, the AWG 20A divides the input ports into a plurality of groups, and combines optical signals in each of the divided groups. In the AWG 20A shown in FIG. 2, the input ports $21A_1$ to $21A_{n+21-2}$ are divided into 1 number of groups so that each of the groups is formed with m number of input ports.

Further, in FIG. 2, the multiplex light of the optical signals input into the input ports $21A_1$ to $21A_m$ as the first group is output from the output port $22A_1$, while the multiplex light of the optical signals input into the input ports $21A_{m+3}$ to $21A_{2m+2}$ as the second group is output not from the output port $22A_2$ adjacent to the output port $22A_1$ but from the following output port $22A_3$.

That is, as explained above, every other port in the output ports becomes effective, therefore, multiplex lights are output as effective optical signals only from the output ports $22A_1, 22A_3, 22A_5, \ldots, 22A_{21-1}$. Accordingly, reduction in crosstalk can further be achieved.

The multiplex lights output from each of the output ports $22A_1, 22A_3, 22A_5, \ldots, 22A_{21-1}$ are further input into the respective corresponding dispersion compensation sections $24A_1$ to $24A_1$ formed with dispersion compensation fibers like in the first embodiment, and are subjected to dispersion compensation. For example, the multiplex light output from the output port $22A_1$ is input into the dispersion compensation section $24A_1$, and is subjected to dispersion compensation for its wavelengths $\lambda_1$ to $\lambda_m$ in the dispersion compensation section $24A_1$.

The multiplex lights subjected to dispersion compensation and output from 1 units of dispersion compensation sections $24A_1$ to $24A_1$ are also input into a wave combiner such as the wave combination coupler 28A, where the lights are further combined to be output to a transmission line 29A, in the same manner as in the first embodiment.

Figure 3:
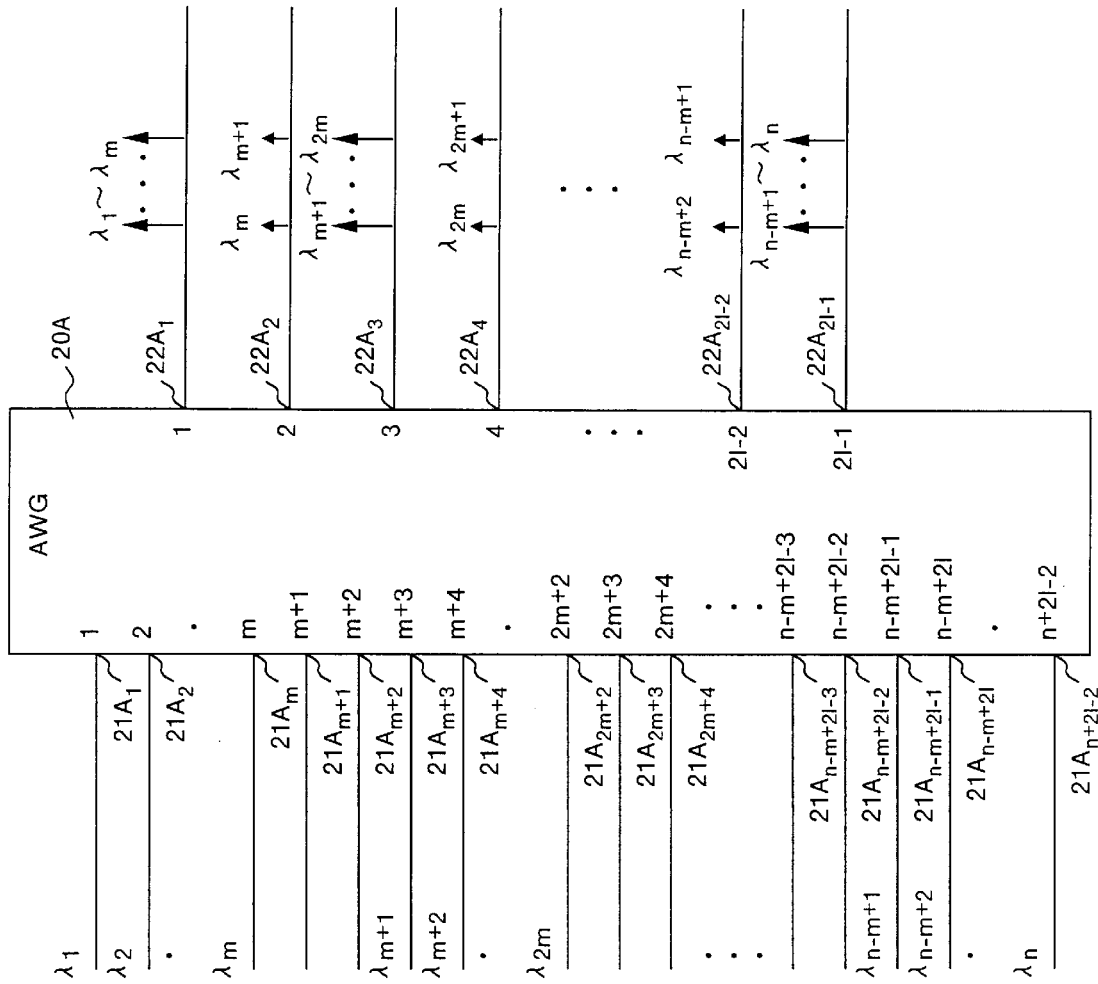
FIG. 3 is an explanatory diagram for explaining reduction of crosstalk in the dispersion compensation apparatus according to the second embodiment.

FIG. 3 is an explanatory diagram for explaining the reduction of crosstalk in the dispersion compensation apparatus according to the second embodiment. In FIG. 3, for example, the optical signals of the wavelengths $\lambda_1$ to $\lambda_m$ input into the input ports $21A_1$ to $21A_m$ forming the first group are output from the output port $22A_1$, but the wavelength $\lambda_m$ of the optical signal in the first group is output as crosstalk to the adjacent output port $22A_2$. However, this output port $22A_2$ is not connected to any of the dispersion compensation sections, therefore, the port functions only as a receiver for crosstalk.

Likewise, the optical signals of the wavelengths $\lambda_{m+1}$ to $\lambda_{2m}$ input into the input ports $21A_{m+3}$ to $21A_{2m+2}$ forming the second group are output from the output port $22A_3$, but the wavelengths $\lambda_{m+1}$ and $\lambda_{2m}$ of the optical signals in the second group are output as crosstalk to the adjacent output ports $22A_2$ and $22A_4$. However, these output ports $22A_2$ and $22A_4$ are not connected to any of the dispersion compensation sections, therefore, the ports function only as receivers for crosstalk.

In order to disable the output port $22A_2$, according to the periodicity shown in FIG. 14, for example, it is necessary to provide input ports $21A_{m+1}$ and $21A_{m+2}$, which do not input optical signals, between the first group of the input ports $21A_1$ to $21A_m$ and the second group of the input ports $21A_{m+3}$ to $21A_{2m+2}$.

Likewise, in order to disable the output port $22A_4$, it is necessary to provide input ports $21A_{2m+3}$ and $21A_{2m+4}$, which do not input optical signals, between the second group of the input ports $21A_{m+3}$ to $21A_{2m+2}$ and a third group of input ports $21A_{2m+5}$ to $21A_{3m+4}$.

As explained above, by providing output ports for outputting crosstalk based on every other section in the output sections set to be effective, optical signals output from adjacent groups through their output ports can be prevented from their mixing in the signals in the effective ones, thus it is possible to improve the quality of multiplex lights input into the dispersion compensation sections $24A_1$ to $24A_1$.

Particularly in this embodiment, in order to make the explanation simpler, the case, where the number of input ports provided between the groups is two and the number of output port is one according to the periodicity shown in FIG. 14, is explained, but it is needless to say that the number of ports provided between the groups may be altered according to the periodicity of the AWG. For example, even if the number of input port provided between the groups is zero and the number of output port is one, crosstalk is output to this output port, therefore, by trying not to perform dispersion compensation on the multiplex light output from this output port and also not to perform processing on the light as effective one, it is possible to perform high-reliability and high-quality dispersion compensation in the corresponding to the respective groups.

Further, although the dispersion compensation apparatus according to the second embodiment is configured to allow the AWG 20A to function as the first wave combiner and transmit a multiplexed optical signal to the transmission line 29A via the wave combination coupler 28A as the second wave combiner, as explained above, the AWG 20A can perform reverse functions of wave combination and wave separation between the input ports and the output ports, so that the wave combination coupler 28A shown in FIG. 2 is replaced with a wave separation coupler and the AWG 20A is used as a wave divider, thereby the multiplex light input from the transmission line 29A can be separated into the wavelengths $\lambda_1$ to $\lambda_n$ via the wave separation coupler, the dispersion compensation sections $24A_1$ to $24A_1$, and the AWG 20A. It is needless to say that the same effect can be given in this case as well.

As explained above, according to the dispersion compensation apparatus in the second embodiment, optical signals of a plurality of different wavelengths are combined by the first wave combiner formed with the AWG 20A or the like at each of a plurality of wavelengths, respective dispersion compensation is performed on the multiplex lights obtained through the wave combination, and the multiplex lights subjected to dispersion compensation are further combined by the second wave combiner formed with the wave combination coupler 28A or the like to be output to the transmission line, therefore, there is no need to provide the dispersion compensation section at each wavelength one to one like in the dispersion compensation apparatus according to the first embodiment, thus it is possible to achieve minimization of the apparatus and cost reduction.

In the first wave combiner formed with the AWG 20A or the like, by dividing the plurality of input ports $21A_1$ to $21A_{n+21-2}$, into which optical signals of a plurality of different wavelengths are input respectively, at each of a plurality of wavelengths (groups) in the same manner as explained above, and by providing output ports for outputting crosstalk based on every other section in the output sections set to be effective, optical signals output from adjacent groups through their output ports can be prevented from their mixing in the signals in the effective ones, thus it is possible to perform high-reliability and high-quality dispersion compensation in the dispersion compensation sections $24A_1$ to $24A_1$ corresponding to the respective groups.

Figure 4:
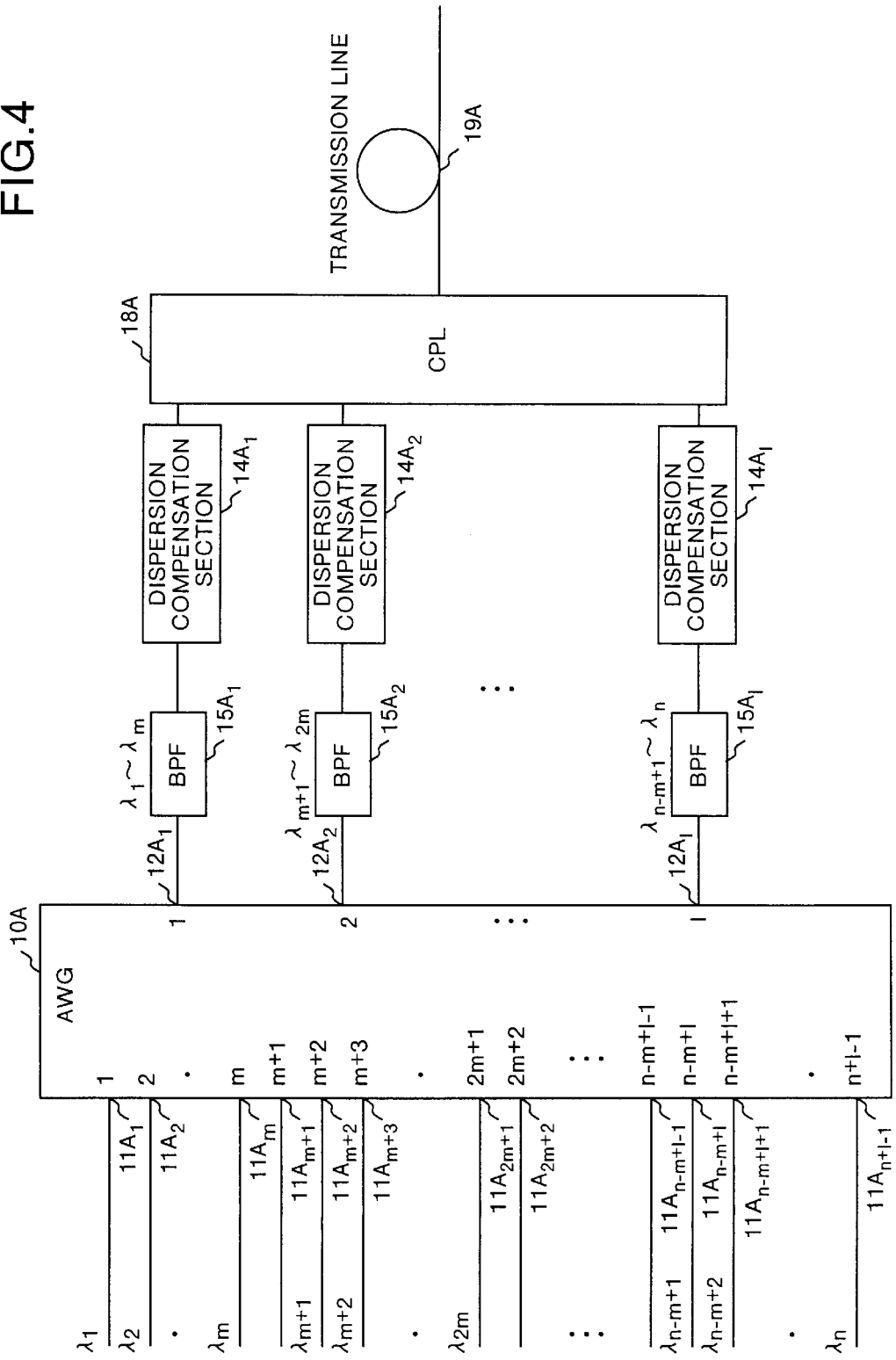
FIG. 4 is a block diagram showing a schematic configuration of a dispersion compensation apparatus according to a third embodiment.

The dispersion compensation apparatus according to the third embodiment is explained below. FIG. 4 is a block diagram showing the schematic configuration of the dispersion compensation apparatus according to the third embodiment. In FIG. 4, the same signs are assigned to those common to the sections in FIG. 1, and explanation of the sections is omitted. The dispersion compensation apparatus shown in FIG. 4 is different from the dispersion compensation apparatus explained in the first embodiment in that respective band-pass filters (BPF) $15A_1$ to $15A_1$ are inserted in between the output ports $12A_1$ to $12A_1$ and the dispersion compensation sections $14A_1$ to $14A_1$.

As shown in FIG. 4, the band-pass filter $15A_1$ is a filter which passes only optical signals of wavelengths $\lambda_1$ to $\lambda_m$ therethrough, and the band-pass filter $15A_2$ is also a filter which passes only optical signals of wavelengths $\lambda_{m+1}$ to $\lambda_{2m}$ therethrough. As explained above, the band-pass filters (BPF) $15A_1$ to $15A_1$ pass only optical signals of wavelengths which should originally be output from output ports and input the optical signals having passed therethrough into the dispersion compensation sections $14_1$ to $14A_1$ in the next stage, therefore, mixing of crosstalk into these dispersion compensation sections $14_1$ to $14A_1$ can further be reduced.

Figure 5:
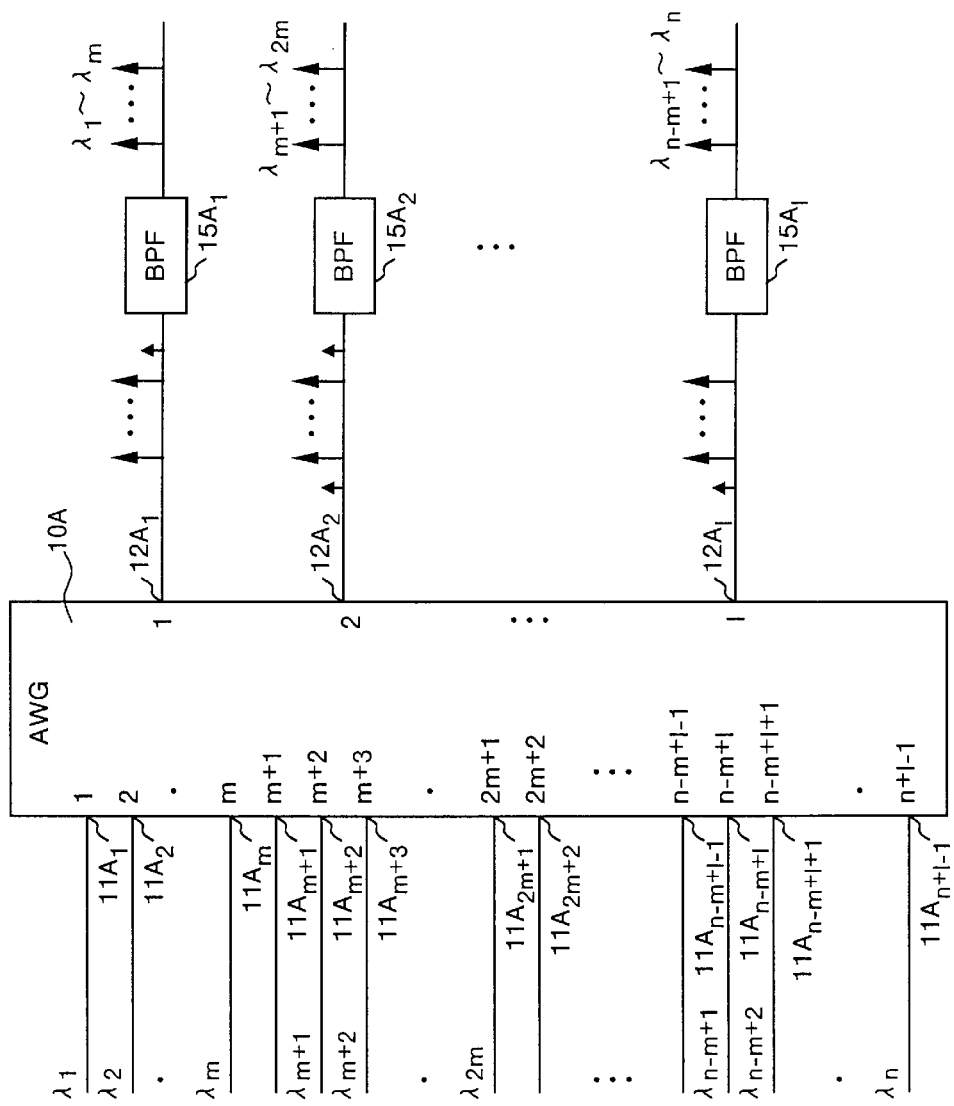
FIG. 5 is an explanatory diagram for explaining reduction of crosstalk in the dispersion compensation apparatus according to the third embodiment.

FIG. 5 is an explanatory diagram for explaining reduction of the crosstalk in the dispersion compensation apparatus according to the third embodiment. In FIG. 5, the wavelength $\lambda_{m+1}$ of the optical signal in the second group may be mixed as crosstalk from the adjacent output port $12A_2$ into the output port $12A_1$ from which the wavelengths $\lambda_1$ to $\lambda_m$ of the optical signals in the first group are output.

So, in order to further obtain only optical signals within a range of target wavelengths from the multiplex lights output from the output ports $12A_1$ to $12A_1$ of the AWG 10A, as shown in FIG. 5, the band-pass filters (BPF) $15A_1$ to $15A_1$, each of which passes only the optical signals within the range of the wavelengths therethrough, are connected to the output stages of the output ports $12A_1$ to $12A_1$. Accordingly, it is possible to reduce mixing of crosstalk into the multiplex lights input into the dispersion compensation sections $14_1$ to $14A_1$.

It should be noted that, in the third embodiment, the band-pass filters (BPF) are installed in the dispersion compensation apparatus according to the first embodiment, and in the dispersion compensation apparatus according to the second embodiment, the same effect can also be obtained by inserting the band-pass filters into between the output ports $22A_1, 22A_3, 22A_5, \ldots, 22A_{21-1}$ of the AWG 20A and the dispersion compensation sections $24A_1$ to $24A_1$ shown in FIG. 2, respectively.

Further, although the dispersion compensation apparatus according to the third embodiment is configured to allow the AWG 10A to function as the first wave combiner and transmit a multiplexed optical signal to the transmission line 19A via the wave combination coupler 18A as the second wave combiner, as explained above, the AWG 10A can perform reverse functions of wave combination and wave separation between the input ports and the output ports, so that the wave combination coupler 18A shown in FIG. 4 is replaced with a wave separation coupler and the AWG 10A is used as a wave divider, thereby the multiplex light input from the transmission line 19A can be separated into the wavelengths $\lambda_1$ to $\lambda_n$ via the wave separation coupler, the dispersion compensation sections $14A_1$ to $14A_1$, the band-pass filters $15A_1$ to $15A_1$, and the AWG 10A. It is needless to say that the same effect can be given in this case as well.

As explained above, according to the dispersion compensation apparatus in the third embodiment, optical signals of a plurality of different wavelengths are combined by the first wave combiner formed with the AWG 10A or the like at each of a plurality of wavelengths, the multiplexed lights obtained through wave combination are passed through the band-pass filters $15A_1$ to $15A_1$ each of which passes only an optical signal of a predetermined wavelength therethrough, respective dispersion compensation is performed on the multiplex lights having passed therethrough, and the multiplex lights subjected to dispersion compensation are further combined by the second wave combiner formed with the wave combination coupler 28A or the like to be output to the transmission line, therefore, there is no need to provide the dispersion compensation section at each wavelength one to one like in the dispersion compensation apparatus according to the first or the second embodiment, thus it is possible to achieve minimization of the apparatus and cost reduction and also perform high-reliability and high-quality dispersion compensation by further reducing mixing of crosstalk in the input stages of the dispersion compensation sections.

Figure 6:
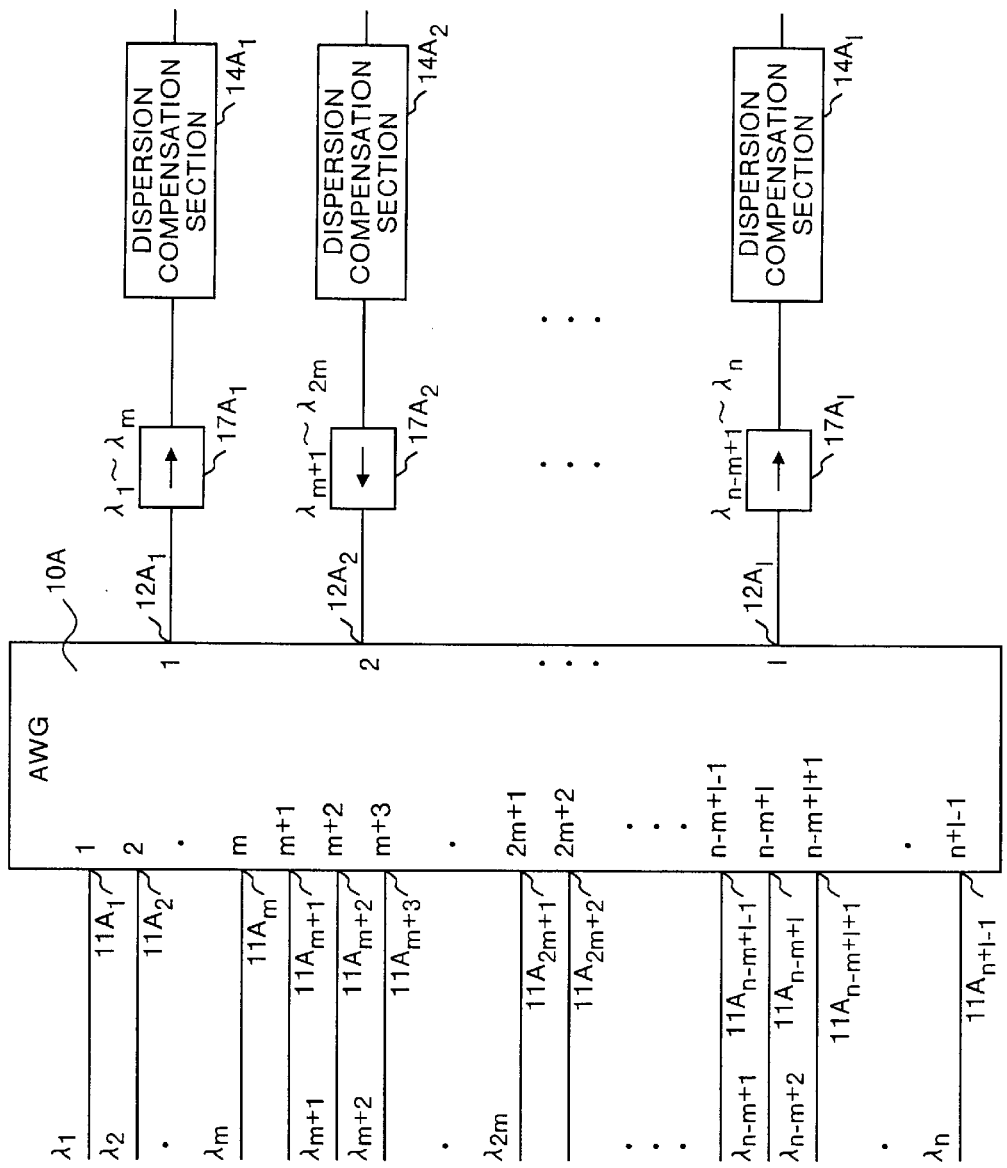
FIG. 6 is a block diagram showing a schematic configuration of a dispersion compensation apparatus according to a fourth embodiment.

The dispersion compensation apparatus according to the fourth embodiment is explained below. FIG. 6 is a block diagram showing the schematic configuration of the dispersion compensation apparatus according to the fourth embodiment. In FIG. 6, the same signs are assigned to those common to the sections in FIG. 1, and explanation of the sections is omitted. However, $11A_{m+2}$ to $11A_{2m+1}$, $11A_{3m+4}$ to $11A_{4m+3}$, ..., and $11A_{n-m+1}$ to $11A_{n+1-1}$, which have functioned as the input ports in the AWG 10A of FIG. 1, function as output ports, while $12A_2$, $12A_4$, ..., and $12A_{1-1}$, which have functioned as the output ports, function as input ports.

That is, the AWG 10A shown in FIG. 6 comprises the input ports $11A_1$ to $11A_m$, $11A_{2m+3}$ to $11A_{3m+2}$, $11A_{n-2m+1-1}$ to $11A_{n-m+1-2}$, $12A_2$, $12A_4$, ..., and $12A_{1-1}$, and the output ports $12A_1$, $12A_3$, ..., $12A_1$, $11A_{m+2}$ to $11A_{2m+1}$, $11A_{3m+4}$ to $11A_{4m+3}$, ..., and $11A_{n-m+1}$ to $11A_{n+1-1}$.

The dispersion compensation apparatus shown in FIG. 6 is different from the dispersion compensation apparatus explained in the first embodiment in that optical isolators $17A_1$ to $17A_1$ are inserted in between the input or output ports $12A_1$ to $12A_1$ of the AWG 10A and the dispersion compensation sections $14A_1$ to $14A_1$, respectively.

Accordingly, the AWG 10A shown in FIG. 6 concurrently performs a wave combination function and a wave separation function such that the AWG 10A combines optical signals of wavelengths $\lambda_1$ to $\lambda_m$ input into the input ports $11A_1$ to $11A_m$ and outputs the signal from the output port $12A_1$, and separates multiplex light of wavelengths $\lambda_{m+1}$ to $\lambda_{2m}$ input into the input port $12A_2$ and outputs the respective optical signals to the output ports $11A_{m+2}$ to $11A_{2m+1}$.

Based on the above configuration, the input port and the output port are adjacent to each other, and in these input port and output port, the input and output directions of optical signals are reverse to each other, therefore, mixing of crosstalk from the adjacent ports can be reduced, thus it is possible to prevent transmission characteristics from being affected thereby. Further, the optical isolators $17A_1$ to $17A_1$ each have a function of cutting off optical signals in the reverse direction to the optical signals input into these optical isolators $17A_1$ to $17A_1$, therefore, the effects to prevent mixing of crosstalk between the input port and the output port into each other by the different directions can further be ensured.

It should be noted that, in the fourth embodiment, the optical isolators are installed in the dispersion compensation apparatus according to the first embodiment, and in the dispersion compensation apparatus according to the second embodiment, the same effect can also be given by inserting the band-pass filters between the output ports $22A_1$, $22A_3$, $22A_5$, ..., $22A_{21-1}$ of the AWG 20A and the dispersion compensation sections $24A_1$ to $24A_1$ shown in FIG. 2, respectively.

As explained above, according to the dispersion compensation apparatus in the fourth embodiment, the wave combiner/divider formed with the AWG 10A or the like outputs multiplexed lights by combining input optical signals of a plurality of different wavelengths at each of a plurality of wavelengths, and outputs optical signals of wavelengths by separating each of the plurality of input multiplex lights having passed through the dispersion compensation sections $14A_2$, $14A_4$, ..., and $14A_{1-1}$ for each of the multiplex lights, and inputs the respective multiplex lights obtained by wave combination into the dispersion compensation sections $14A_1$, $14A_3$, ..., and $14A_1$ via the respective optical isolators $17A_1$, $17A_3$, ..., and $17A_1$, therefore, there is no need to provide the dispersion compensation section at each wavelength one to one like in the dispersion compensation apparatus according to the first or the second embodiment, thus it is possible to achieve minimization of the apparatus and cost reduction, reduce mixing of crosstalk between the input port and the output port into each other, and perform high-reliability and high-quality dispersion compensation.

Figure 7:
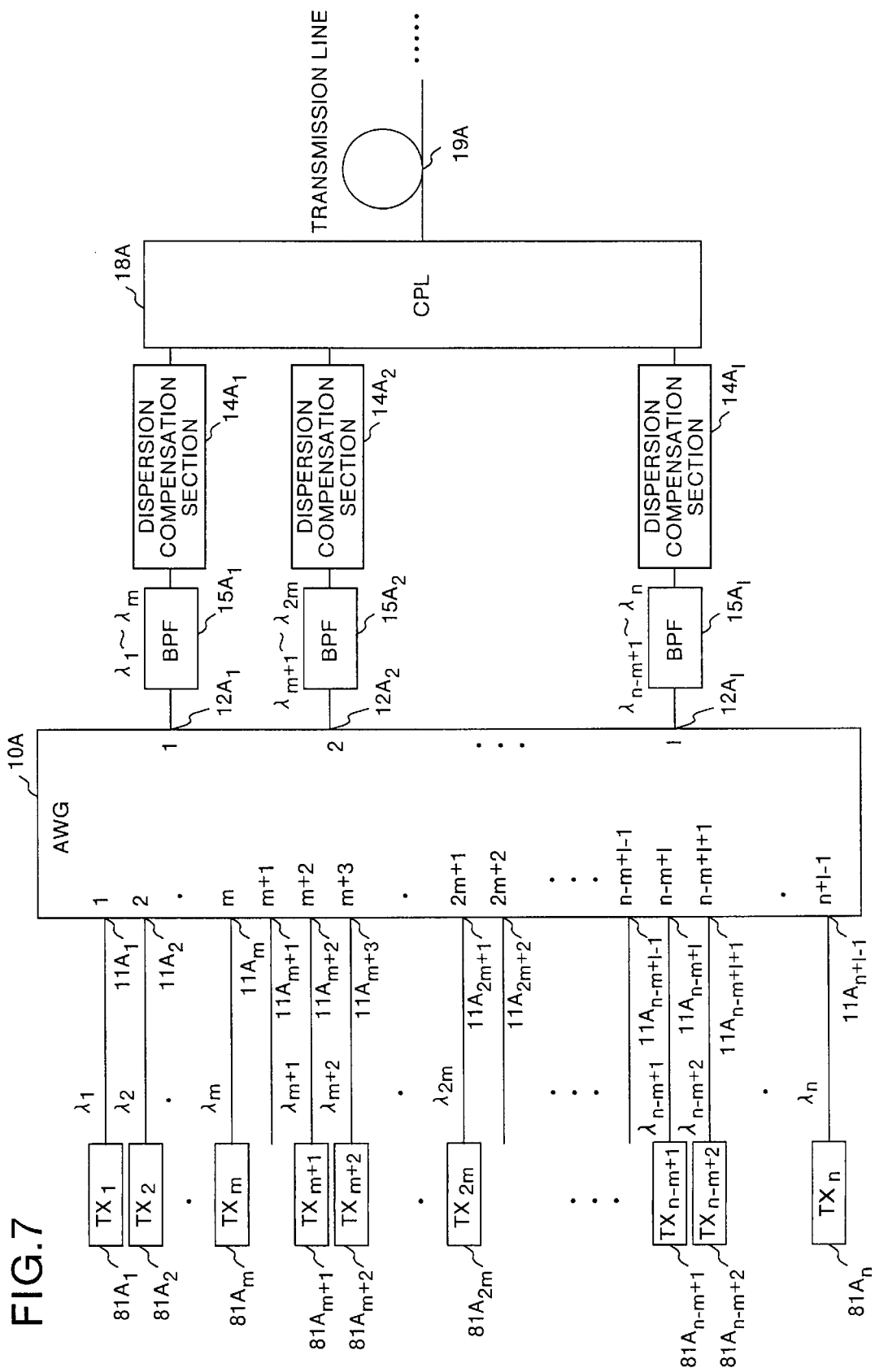
FIG. 7 is a block diagram showing a part of a schematic configuration of a dispersion compensation system according to a fifth embodiment.
Figure 8:
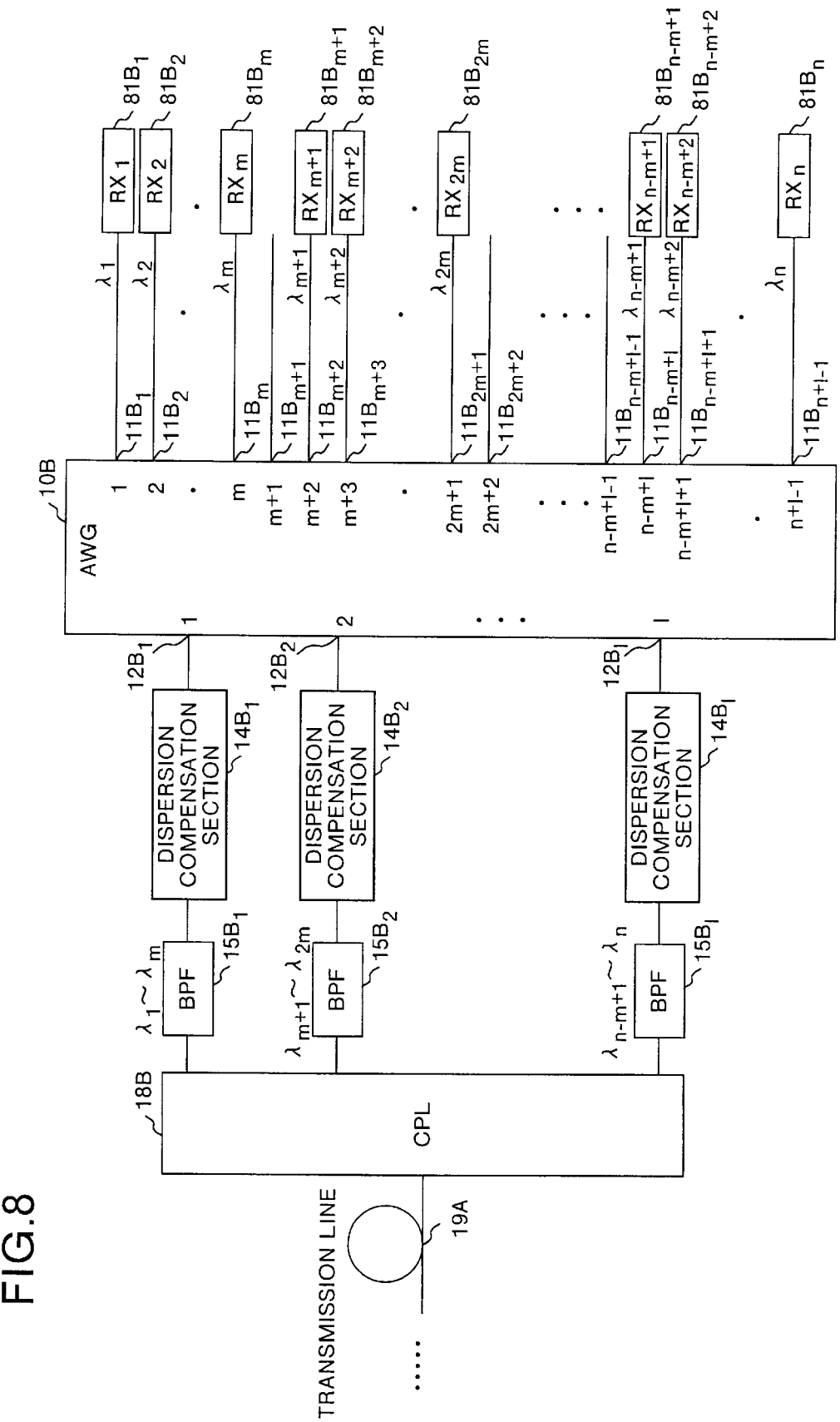
FIG. 8 is a block diagram showing the other part of the schematic configuration of the dispersion compensation system according to the fifth embodiment.

The dispersion compensation system according to the fifth embodiment is explained below. FIG. 7 and FIG. 8 show a block diagram of the schematic configuration of the dispersion compensation system according to the fifth embodiment. In FIG. 7 and FIG. 8, the same signs are assigned to those common to the sections in FIG. 4, and explanation of the sections is omitted. The dispersion compensation system shown in FIG. 7 and FIG. 8 is configured, in the optical transmission system, to allow the dispersion compensation apparatus according to the third embodiment to function as a wave combiner and provide it in the transmission side, and also allow the dispersion compensation apparatus according to the third embodiment to function as a wave divider and provide it in the reception side.

The dispersion compensation system as shown in FIG. 7 and FIG. 8 comprises, in the transmission side, n units of transmitters $81A_1$ to $81A_n$ which oscillate different wavelengths from one another, the AWG 10A which receives optical signals output from the transmitters $81A_1$ to $81A_n$ into n number of input ports $11A_1$ to $11A_{n+1-1}$ and combines the signals in each predetermined group, the band-pass filters $15A_1$ to $15A_1$ which pass predetermined wavelengths of respective multiplex lights output from the output ports $12A_1$ to $12A_1$ of the AWG 10A therethrough, the dispersion compensation sections $14A_1$ to $14A_1$ which perform dispersion compensation on the wavelengths of the multiplex lights having passed through the band-pass filters $15A_1$ to $15A_1$, and the wave combination coupler 18A which combines the multiplex lights output from these dispersion compensation sections $14A_1$ to $14A_1$. The optical signal combined in this wave combination coupler 18A is transmitted to the transmission line 19A.

In the reception side, on the other hand, the dispersion compensation system comprises a wave separation coupler 18B which demultiplexes (separates) the wavelengths in each group of the wavelengths corresponding to those in the wave combination coupler 18A, band-pass filters $15B_1$ to $15B_1$ which pass predetermined wavelengths therethrough, dispersion compensation sections $14B_1$ to $14B_1$ which perform dispersion compensation on the wavelengths of the multiplex lights having passed through the band-pass filters $15B_1$ to $15B_1$, an AWG 10B which receives the optical signals, which are sent through blocks consisting of the band-pass filters $15B_1$ to $15B_1$ and the dispersion compensation sections $14B_1$ to $14B_1$ respectively, into 1 number of input ports $12B_1$ to $12B_1$ and separates the signals into optical signals of wavelengths $\lambda_1$ to $\lambda_n$, and receivers $81B_1$ to $81B_n$ which receive the optical signals of respective wavelengths output from the output ports $11B_1$ to $11B_{n+1-1}$ of the AWG 10B.

In FIG. 7, for example, the optical signals of wavelengths $\lambda_1$ to $\lambda_m$ oscillated by the transmitters $81A_1$ to $81A_m$ are input into the input ports $11A_1$ to $11A_m$ of the AWG 10A and combined therein, and the combined light is output from the output port $12A_1$ as multiplex light.

The multiplex light output from the output port $12A_1$ is input into the band-pass filter $15A_1$, thereby, the multiplex light only in the range of wavelengths $\lambda_1$ to $\lambda_m$ can be output to the dispersion compensation section $14A_1$ in the next stage, by which mixing of any optical signals of unnecessary wavelengths there into is prevented. The multiplex light having passed through the band-pass filter $15A_1$ is subjected to dispersion compensation by the dispersion compensation section $14A_1$, is then combined with other multiplex lights by the wave combination coupler 18A, and the combined light is output to the transmission line 19A as multiplex light of the wavelengths $\lambda_1$ to $\lambda_n$.

In FIG. 8, the multiplex light of the wavelengths $\lambda_1$ to $\lambda_n$ transmitted through the transmission line 19A is separated by the wave separation coupler 18B into each range, that is, each group of the wavelengths multiplexed in the AWG 10A. The separated multiplex light of the wavelengths $\lambda_1$ to $\lambda_m$ is input into the band-pass filter $15B_1$, accordingly, the multiplex light only in the range of the wavelengths $\lambda_1$ to $\lambda_m$ can be input into the dispersion compensation section $14B_1$ in the next stage, by which mixing of any optical signals of unnecessary wavelengths there into is prevented.

The multiplex light having passed through the band-pass filter $15B_1$ is subjected to dispersion compensation by the dispersion compensation section $14B_1$, then input into the input port $12B_1$ of the AWG 10B and separated into the optical signals of the wavelengths $\lambda_1$ to $\lambda_m$, and the respective signals are output from the output ports $11B_1$ to $11B_m$. The optical signals output from the output ports $11B_1$ to $11B_m$ are received in the receivers $81B_1$ to $81B_m$, where the optical signals output from the transmitters $81A_1$ to $81A_m$ are restored.

It should be noted that, in the fifth embodiment, the dispersion compensation apparatus according to the third embodiment when the band-pass filters are installed in the dispersion compensation apparatus according to the first embodiment is applied, but the dispersion compensation apparatus according to the third embodiment when the band-pass filters are installed in the dispersion compensation apparatus according to the second embodiment may be applied. Further, the dispersion compensation apparatus according to the first embodiment or the second embodiment may be applied in this dispersion compensation system.

As explained above, according to the dispersion compensation system in the fifth embodiment, the dispersion compensation apparatuses according to any of the first to third embodiments are disposed in the transmission section and the reception section of the optical transmission system, therefore, it is possible to enjoy the effect given by the dispersion compensation apparatus according to these first to third embodiments.

Figure 9:
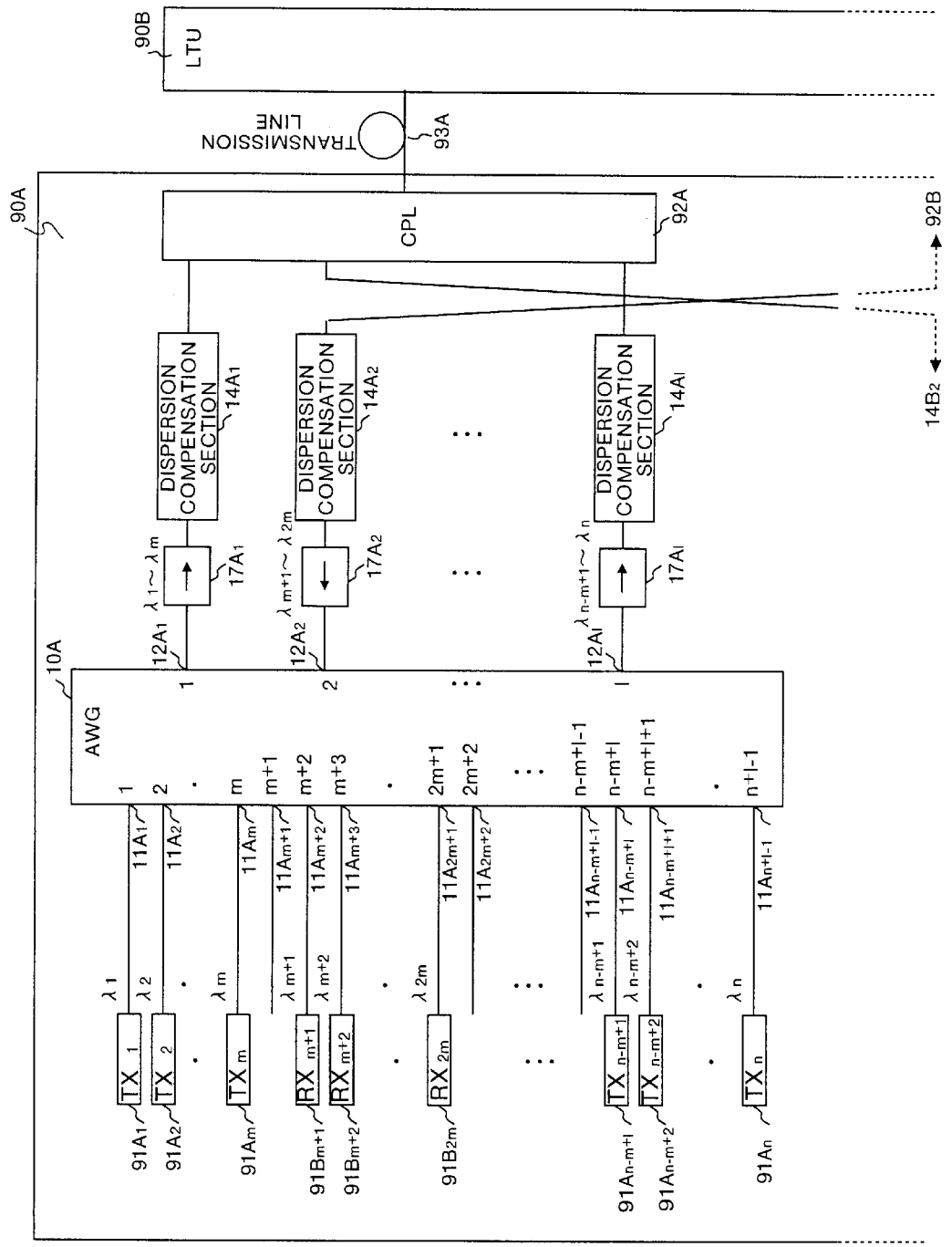
FIG. 9 is a block diagram showing a part of a schematic configuration of a dispersion compensation system according to a sixth embodiment.
Figure 10:
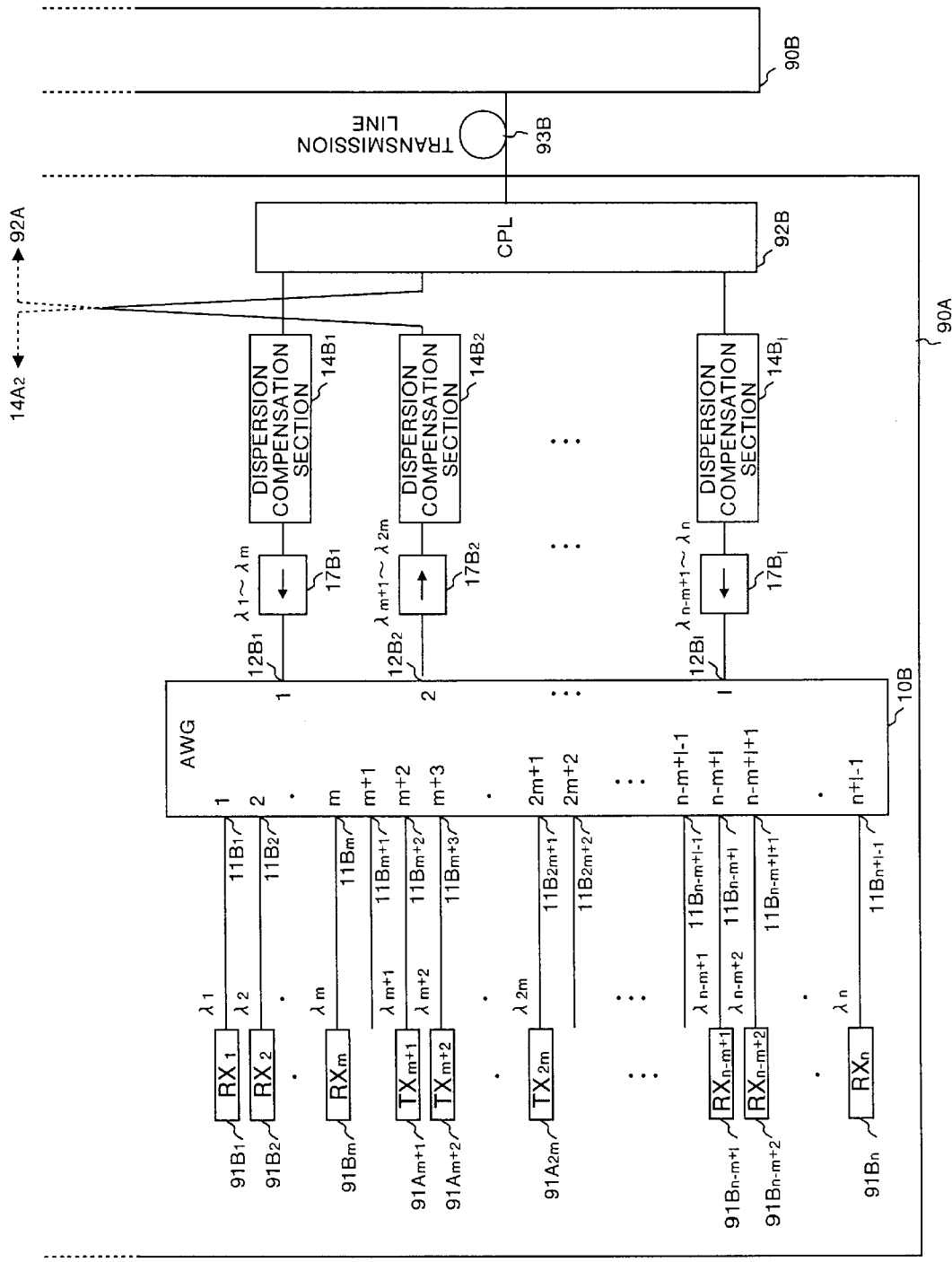
FIG. 10 is a block diagram showing the other part of the schematic configuration of the dispersion compensation system according to the sixth embodiment.
Figure 11:
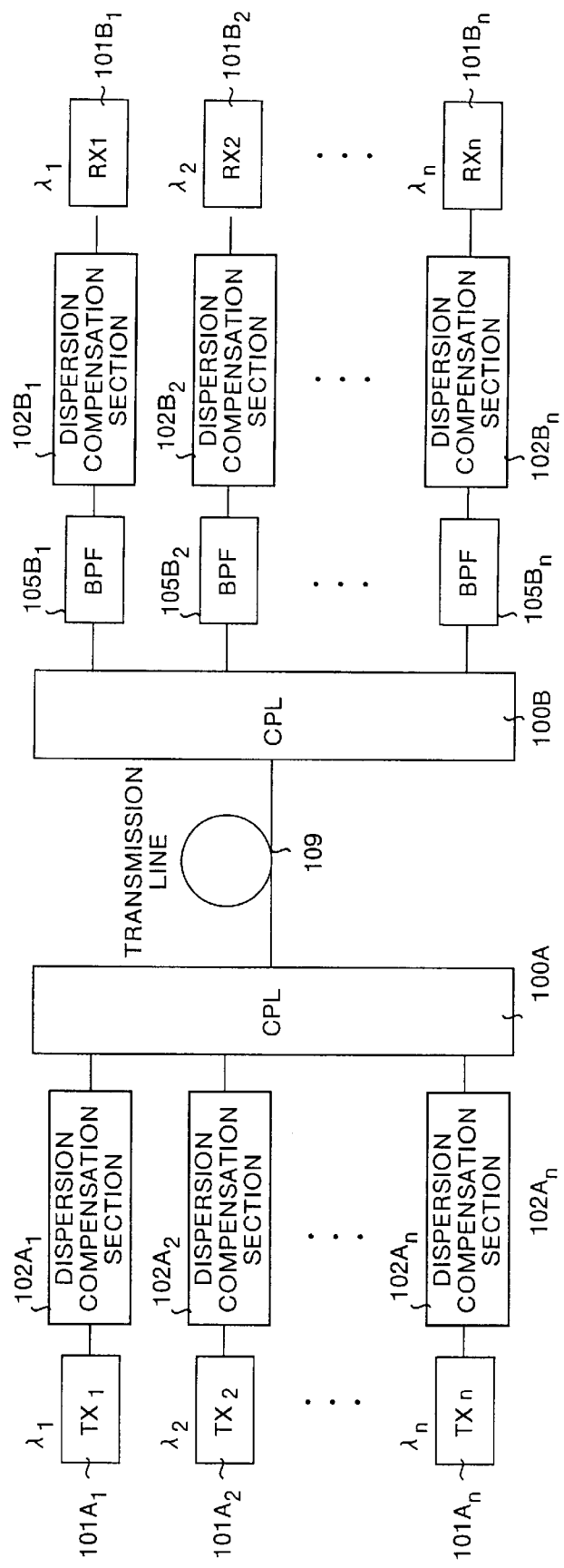
FIG. 11 is a block diagram showing an example of a conventional wavelength dispersion compensation system.
Figure 12:
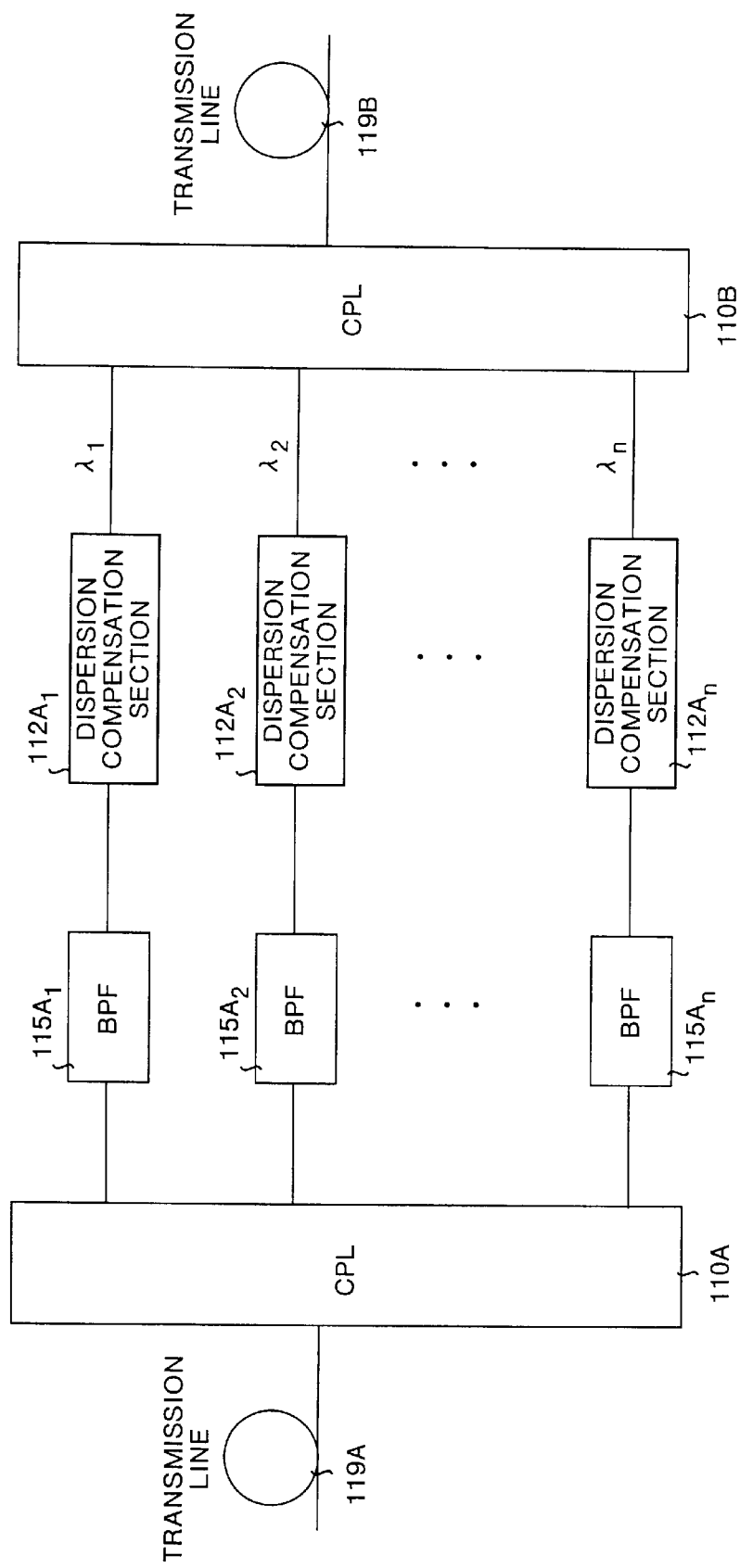
FIG. 12 is a block diagram showing another example of the conventional wavelength dispersion compensation system.
Figure 13:
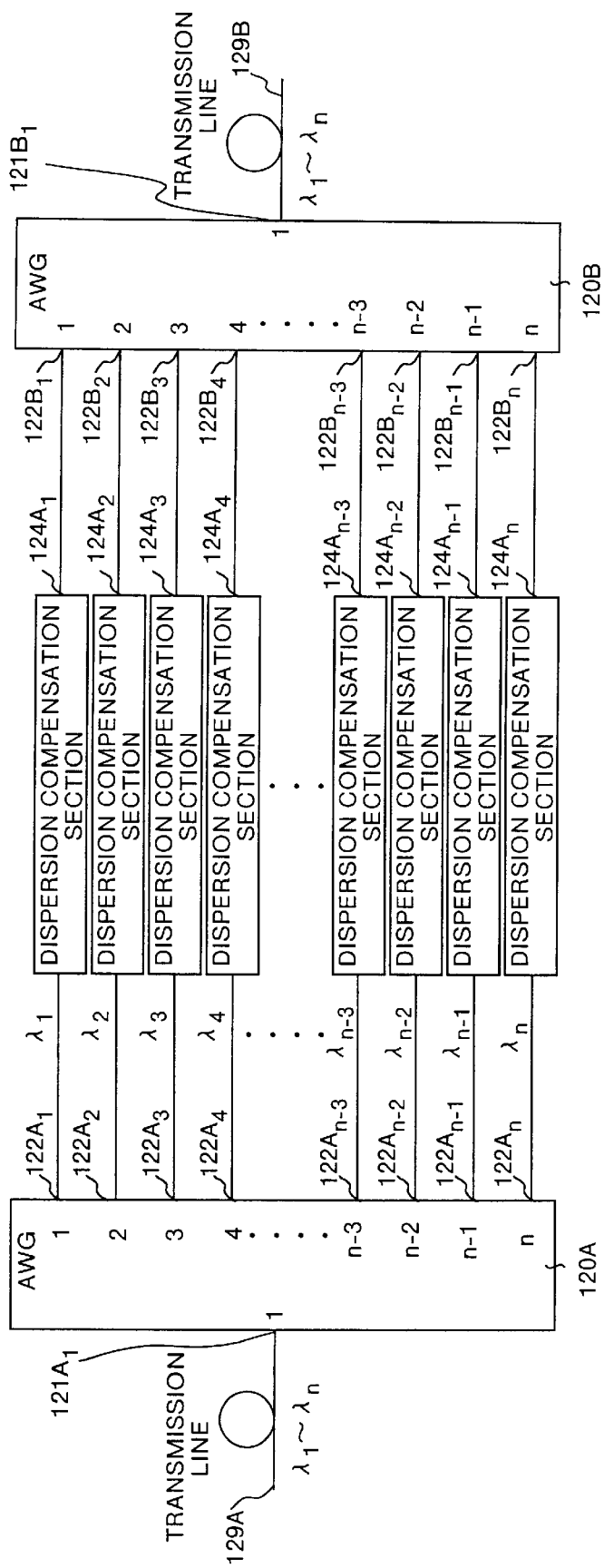
FIG. 13 is a block diagram showing the conventional wavelength dispersion compensation system using the AWG.
Figure 15:
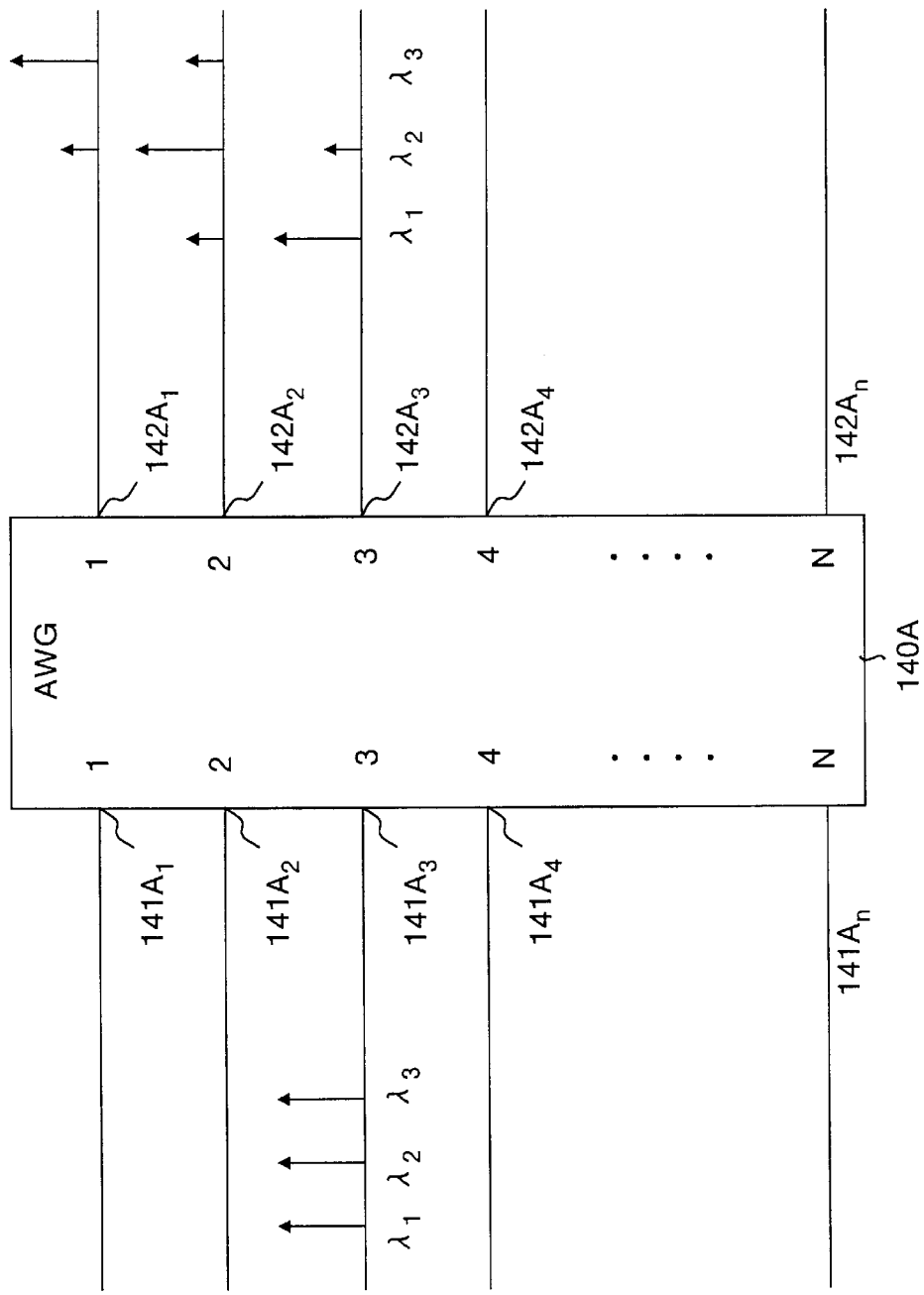
FIG. 15 is an explanatory diagram for explaining the crosstalk in the AWG.

The dispersion compensation system according to the sixth embodiment is explained below. FIG. 9 and FIG. 10 show a block diagram of the schematic configuration of the dispersion compensation system according to the sixth embodiment. In FIG. 9 and FIG. 10, the same signs are assigned to those common to the sections in FIG. 6, and explanation of the sections is omitted. The dispersion compensation system shown in FIG. 9 and FIG. 10 is formed with a transmission/reception section having two dispersion compensation apparatuses according to the fourth embodiment.

The dispersion compensation system shown in FIG. 9 is configured to make a connection between a transmission/reception section 90A and a transmission/reception section 90B through transmission lines 93A and 93B. The transmission/reception section 90A and the transmission/reception section 90B have the same configuration as each other, therefore, the configuration of the transmission/reception section 90A in particular is explained here.

In FIG. 9 and FIG. 10, the transmission/reception section 90A is configured to provide two units of the dispersion compensation apparatus according to the fourth embodiment. At first, a first dispersion compensation apparatus has the same configuration as that shown in FIG. 6 as is clear from FIG. 9, and comprises the AWG 10A having the input ports, into which effective optical signals are input, $11A_1$ to $11A_m$, $11A_{2m+3}$ to $11A_{3m+2}$, ..., $11A_{n-m+1}$ to $11A_{n+1-1}$, $12A_2$, $12A_4$, ..., and $12A_{1-1}$, and the output ports $12A_1$, $12A_3$, ..., $12A_1$, $11A_{m+2}$ to $11A_{2m+1}$, $11A_{3m+4}$ to $11A_{4m+3}$, ..., and $11A_{n-2m+1+1}$ to $11A_{n-m+1}$; the optical isolators $17A_2$, $17A_4$, ..., and $17A_{1-1}$ provided upstream from and connected to the input ports $12A_2$, $12A_4$, ..., and $12A_{1-1}$, respectively; the optical isolators $17A_1$, $17A_3$, ..., and $17A_1$ provided downstream from and connected to the output ports $12A_1$, $12A_3$, ..., and $12A_1$, respectively; and the dispersion compensation sections $14A_1$ to $14A_1$ connected to these optical isolators $17A_1$ to $17A_1$, respectively.

Further, in this first dispersion compensation apparatus, transmitters $91A_1$ to $91A_m$, $91A_{2m+1}$ to $91A_{3m}$, ..., $91A_{n-m+1}$ to $91A_n$ which oscillate optical signals having different wavelengths from one another are connected to the input ports $11A_1$ to $11A_m$, $11A_{2m+3}$ to $11A_{3m+2}$, ..., $11A_{n-m+1}$ to $11A_{n+1-1}$. Further, receivers $91B_{m+1}$ to $91B_{2m}$, $91B_{4m+1}$ to $91B_{5m}$, ..., $91B_{n-2m+1}$ to $91B_{n-m}$ which receive optical signals having different wavelengths from one another are connected to the output ports $11A_{m+2}$ to $11A_{2m+1}$, $11A_{3m+4}$ to $11A_{4m+3}$, ..., and $11A_{n-2m+1-1}$ to $11A_{n-m+1}$.

On the other hand, a second dispersion compensation apparatus, like in the first dispersion compensation apparatus as shown in FIG. 10, comprises the AWG 10B having input ports, into which effective optical signals are input, $11B_{m+2}$ to $11B_{2m+1}$, $11B_{3m+4}$ to $11B_{4m+3}$, ..., $11B_{n-2m+1+1}$ to $11B_{n-m+1}$, $12B_2$, $12B_4$, ..., and $12B_{1-1}$, and output ports $11B_1$ to $11B_m$, $11B_{2m+3}$ to $11B_{3m+2}$, ..., $11B_{n-m+1}$ to $11B_{n+1-1}$, $12B_1$, $12B_3$, ..., and $12B_1$; optical isolators $17B_1$, $17B_3$, ..., and $17B_1$ provided upstream from and connected to the input ports $12B_1, 12B_3, \ldots,$ and $12B_1$, respectively; optical isolators $17B_2, 17B_4, \ldots,$ and $17B_{1-1}$ provided downstream from and connected to the output ports $12B_2, 12B_4, \ldots,$ and $12B_{1-1}$, respectively; and dispersion compensation sections $14B_1$ to $14B_1$ connected to these optical isolators $17B_1$ to $17B_1$, respectively.

Further, in the second dispersion compensation apparatus, transmitters $91A_{m+1}$ to $91A_{2m}$, $91A_{4m+1}$ to $91A_{5m}, \ldots, 91A_{n-2m+1}$ to $91A_{n-m}$ which oscillate optical signals of different wavelengths from one another are connected to the input ports of the AWG 10B $11B_{m+2}$ to $11B_{2m+1}$, $11B_{3m+4}$ to $11B_{4m+3}, \ldots, 11B_{n-2m+1+1}$ to $11B_{n-m+1}$, respectively. Further, receivers $91B_1$ to $91B_m$, $91B_{2m+1}$ to $91B_{3m}, \ldots, 91B_{n-m+1}$ to $91B_n$ which receive optical signals of different wavelengths from one another are connected to the output ports $11B_1$ to $11B_m$, $11B_{2m+3}$ to $11B_{3m+2}, \ldots, 11B_{n-m+1}$ to $11B_{n+1-1}$, respectively.

Accordingly, based on the configurations of the first and the second dispersion compensation apparatuses, in the whole obtained by combining the AWG 10A of the first dispersion compensation apparatus with the AWG 10B of the second dispersion compensation apparatus, the optical signals of the wavelengths $\lambda_1$ to $\lambda_n$ are oscillated from the transmitters $91A_1$ to $91A_n$ without overlaps, and the receivers $91B_1$ to $91B_n$ receive these optical signals of wavelengths $\lambda_1$ to $\lambda_n$, respectively.

The multiplex lights output from the output ports $12A_1, 12A_3, \ldots, 12A_1$ and $12B_2, 12B_4, \ldots,$ and $12B_{1-1}$ of the first and the second dispersion compensation apparatuses are input into a wave combination coupler 92A via the optical isolators and the dispersion compensation sections, and the combined light is output to the transmission line 93A as further multiplexed light.

The multiplex light transmitted from the transmission line 93B is input into a wave separation coupler 92B, where it is separated into respective lights so as to be input into the input ports $12A_2, 12A_4, \ldots,$ and $12A_{1-1}$ and $12B_1, 12B_3, \ldots,$ and $12B_1$ of the first and the second dispersion compensation apparatuses via the dispersion compensation sections and the optical isolators.

In FIG. 9, for example, the optical signals of the wavelengths $\lambda_1$ to $\lambda_m$ oscillated by the transmitters $91A_1$ to $91A_m$ are input into the input ports $11A_1$ to $11A_m$ of the AWG 10A and are combined therein, and the combined light is output from the output port $12A_1$ as multiplex light.

The multiplex light output from the output port $12A_1$ is input into the optical isolator $17A_1$, and the direction of the multiplex light can be ensured by this optical isolator $17A_1$. Accordingly, it is possible to prevent the mixing of crosstalk from multiplex light which is input into the adjacent input port $12A_2$ and is in a reverse direction to the multiplex light output from the output port $12A_1$, thus it is possible to output the multiplex light only in the range of the wavelengths $\lambda_1$ to $\lambda_m$ to the dispersion compensation section $14A_1$ in the next stage.

The multiplex light having passed through the optical isolator $17A_1$ is subjected to dispersion compensation by the dispersion compensation section $14A_1$, then combined, by the wave combination coupler 92A, with other multiplex lights including the multiplex lights output from the dispersion compensation sections $14B_2, 14B_4, \ldots, 14B_{1-1}$ of the second dispersion compensation apparatus, and the combined light is output to the transmission line 93A as multiplex light of the wavelengths $\lambda_1$ to $\lambda_n$. The multiplex light output to the transmission line 93A received in the receiver of the other transmission/reception section 90B, where the optical signals output from the transmitters $91A_1$ to $91A_m$ are restored.

It should be noted that, in the sixth embodiment, the dispersion compensation apparatus according to the fourth embodiment when the optical isolators are installed in the dispersion compensation apparatus according to the first embodiment is applied, but the dispersion compensation apparatus according to the fourth embodiment when the optical isolators are installed in the dispersion compensation apparatus according to the second embodiment may be applied.

As explained above, according to the dispersion compensation system in the sixth embodiment, the dispersion compensation apparatuses according to the fourth embodiment are disposed in the transmission section and the reception section of the optical transmission system, therefore, it is possible to enjoy the effect given by the dispersion compensation apparatus according to the fourth embodiment.

As explained above, according to this invention, there are provided the first wave combiner which, when a plurality of optical signals having different wavelengths from one another are input and multiplex light of them is to be obtained, divides the plurality of input optical signals into a plurality of groups, and outputs, by combining the optical signals included in each of the divided groups, first multiplex light in each of the groups; and the second wave combiner which outputs second multiplex light as final multiplex light by combining the plurality of first multiplex lights, which makes it possible to perform dispersion compensation and band-passing on the first multiplex lights smaller in number than the number of initially input optical signals and perform high-reliability optical transmission with a simpler configuration, thus obtaining such an effect that cost reduction and minimization of the apparatus can be achieved.

According to the next invention, the first wave combiner has the leakage suppression unit which receives a plurality of optical signals in each of the groups and suppresses leakage (crosstalk or the like) of the optical signals included in adjacent groups, which makes it possible to remove any unnecessary wavelength components for the first multiplex light, thus obtaining such an effect that high-reliability optical transmission can be performed.

According to the next invention, the first wave combiner has the leakage output section which becomes an outlet of the leakage signal as the leakage suppression unit which receives a plurality of optical signals in each group and suppressing leakage (crosstalk or the like) of the optical signals included in adjacent groups, thus obtaining such an effect that any unnecessary wavelength components input from the adjacent groups can be processed as ineffective ones.

According to the next invention, there is provided the dispersion compensation unit which subjects each of the first multiplex lights output from the first wave combiner to compensation for dispersion of the predetermined wavelengths, therefore, there is no need to discretely provide the dispersion compensation unit for each of the optical signals input into the first wave combiner, thus obtaining such an effect that the configuration of the apparatus can be simplified and minimized.

According to the next invention, the filter unit which passes only an optical signal of a predetermined wavelength is provided on the previous stage to the dispersion compensation unit, therefore any unnecessary wavelength components are removed more effectively, which makes it possible to obtain only multiplex light within a range of target wavelengths, thus obtaining such an effect that the reliability of optical transmission can be increased.

According to the next invention, the first wave combiner is an arrayed-waveguide grating, which makes it possible to produce this first wave combiner as a part of a planar lightwave circuit, thus obtaining such an effect that the configuration of the apparatus can be minimized.

According to the next invention, there are provided the first wave divider which, when a plurality of optical signals having different wavelengths from one another included in multiplex light are to be obtained, first separates the first multiplex light to output a plurality of second multiplex lights, and the second wave divider which outputs final optical signals included in each of the second multiplex lights, which makes it possible to perform dispersion compensation and band-passing on the second multiplex lights smaller in number than the number of optical signals to be finally output and perform high-reliability optical transmission with a simpler configuration, thus obtaining such an effect that cost reduction and minimization of the apparatus can be achieved.

According to the next invention, the second wave divider has the leakage suppression unit which receives the first multiplex light and suppressing leakage of adjacent multiplex lights, which makes it possible to remove any unnecessary wavelength components for the second multiplex light, thus obtaining such an effect that high-reliability optical transmission can be performed.

According to the next invention, the second wave divider has the leakage output section which becomes an outlet of a leakage signal as the leakage suppression unit which receives a plurality of optical signals for each group and suppressing leakage (crosstalk or the like) of the optical signals included in adjacent groups, thus obtaining such an effect that any unnecessary wavelength components input from the adjacent groups can be processed as ineffective ones.

According to the next invention, there is provided the dispersion compensation unit which subjects each of the second multiplex lights output from the first wave divider to compensation for dispersion of the predetermined wavelength, therefore, there is no need to discretely provide the dispersion compensation unit such as a dispersion compensation fiber for each of the optical signals to be finally output from the second wave divider, thus obtaining such an effect that the configuration of the apparatus can be simplified and minimized.

According to the next invention, the filter unit such as a band-pass filter, which passes only an optical signal of a predetermined wavelength therethrough, is provided on the previous stage to the dispersion compensation unit, which makes it possible to obtain only multiplex light within a range of target wavelengths by more effectively removing any unnecessary wavelength components, thus obtaining such an effect that the reliability of optical transmission can be increased.

According to the next invention, the second wave divider is an arrayed-waveguide grating, which makes it possible to produce this second wave divider as a part of a planar lightwave circuit, thus obtaining such an effect that the configuration of the apparatus can be minimized.

According to the next invention, there is provided the wave combiner/divider which receives a plurality of optical signals having different wavelengths from one another, separates the plurality of input optical signals into a plurality of first groups, combines the optical signals included in each of the first groups to output the signal as first multiplex light, inputs a plurality of second multiplex lights, and outputs a plurality of optical signals included in the second multiplex lights in each second group by separating each of the input second multiplex lights; in which the input sections which receives the optical signals of the first groups and the output sections for outputting the optical signals of the second groups are arranged alternately and adjacent to each other, and also the output sections for outputting the first multiplex light and the input sections which receives the second multiplex light are arranged alternately and adjacent to each other, which makes it possible to concurrently perform transmission of multiplex light formed with a plurality of optical signals and reception of a plurality of optical signals separated from the multiplex light, perform dispersion compensation and band-passing on the first or the second multiplex lights smaller in number than the number of initially input optical signals or the number of optical signals to be finally output, and perform high-reliability optical transmission with a simpler configuration, thus obtaining such an effect that cost reduction and minimization of the apparatus can be achieved.

According to the next invention, there is provided the dispersion compensation unit, which subjects each of the first multiplex light and the second multiplex light to compensation for dispersion of the predetermined wavelength, therefore, there is no need to discretely provide the dispersion compensation unit for each of the optical signals to be initially input or of the optical signals to be finally output to or from the wave combiner/divider, thus obtaining such an effect that the configuration of the apparatus can be simplified and minimized.

According to the next invention, the optical isolators are provided on the following stage of the output sections for outputting the first multiplex lights and on the previous stage to the input sections which receives the second multiplex lights, respectively, which makes it possible to prevent optical signals in a reverse direction from being mixed into these output sections and input sections, ensure the direction of the optical signals between the adjacent input/output sections, thus obtaining such an effect that high-reliability optical transmission can be performed.

According to the next invention, the dispersion compensation system is constructed by providing the above described specific dispersion compensation apparatus in the transmission section and the above described specific dispersion compensation apparatus in the reception section, which makes it possible to enjoy the effects obtained by the dispersion compensation apparatus which performs high-reliability optical transmission with a simpler configuration, thus obtaining such an effect that cost reduction can also be achieved in the overall dispersion compensation system.

According to the next invention, the dispersion compensation system is constructed by providing the above described specific dispersion compensation apparatuses in the transmission section and the reception section, which makes it possible to enjoy the effects obtained by the dispersion compensation apparatus which performs high-reliability optical transmission with a simpler configuration, thus obtaining such an effect that cost reduction can also be achieved in the overall dispersion compensation system.

INDUSTRIAL APPLICABILITY

As explained above, the dispersion compensation apparatus and the dispersion compensation system according to the present invention are suitable to reduce crosstalk at the time of wave combination and wave separation particularly in the optical transmission system, which performs wavelength multiplexing transmission, for construction of optical networking using optical fibers.

What is claimed is:

1. A dispersion compensation apparatus that performs dispersion compensation in an optical transmission system, the apparatus comprising:

an arrayed waveguide grating incorporating a first wave combiner for receiving a plurality of optical signals having different wavelengths, dividing the received optical signals into a plurality of groups based on where the signals are received at the input, combining the optical signals included in each of the divided groups, and outputting a plurality of first multiplexed lights corresponding to each of the groups; and a second wave combiner for receiving the plurality of first multiplexed lights outputted from said first wave combiner, combining the plurality of first multiplexed lights, and outputting a second multiplexed light.

2. The dispersion compensation apparatus according to claim 1, wherein said first wave combiner has a leakage suppression unit that receives the optical signals in each of the groups and suppresses leakage of optical signals included in adjacent groups.

3. The dispersion compensation apparatus according to claim 2, wherein said leakage suppression unit has at least one leakage signal output terminal, which is provided between output sections for outputting multiplexed light in each of the groups, and outputs leakage of the optical signals included in the adjacent groups.

4. The dispersion compensation apparatus according to claim 1 further comprising a plurality of dispersion compensation units each of which subjects the corresponding plurality of first multiplexed lights outputted from said first wave combiner to compensation for dispersion of predetermined wavelengths.

5. The dispersion compensation apparatus according to claim 4 further comprising a filter unit provided on a previous stage to each of said dispersion compensation units, wherein said filter unit allows only an optical signal of a predetermined wavelength to pass through.

6. The dispersion compensation apparatus according to claim 1, wherein said first wave combiner is an arrayed-waveguide grating.

7. A dispersion compensation apparatus that performs dispersion compensation in an optical transmission system, the apparatus comprising:

an arrayed waveguide grating incorporating a first wave divider for receiving a first multiplexed light, which includes a plurality of optical signals having different wavelengths and grouped based on where the optical signals are received at an input of a multiplexing operation, and separating the first multiplexed light into the plurality of groups designated during the multiplexing operation to output a plurality of second multiplex lights; and a second wave divider for receiving the plurality of second multiplexed lights outputted from said first wave divider, separating each of the input second multiplexed lights, and outputting a plurality of second optical signals having different wavelengths.

8. The dispersion compensation apparatus according to claim 7, wherein said second wave divider has a leakage suppression unit that suppresses leakage of adjacent multiplexed lights at the time of inputting the second multiplexed lights.

9. The dispersion compensation apparatus according to claim 8, wherein said leakage suppression unit has at least one leakage signal output terminal, which is provided between output sections for outputting multiplexed light in each of the groups, and outputs leakage of the optical signals included in the adjacent groups.

10. The dispersion compensation apparatus according to claim 7 further comprising a plurality of dispersion compensation units each of which subjects the corresponding plurality of second multiplexed lights outputted from said first wave divider to compensation for dispersion of predetermined wavelengths.

11. The dispersion compensation apparatus according to claim 10 further comprising a filter unit provided on a previous stage to each of said dispersion compensation units, wherein said filter unit allows only an optical signal of a predetermined wavelength to passes through.

12. A dispersion compensation system that performs dispersion compensation in an optical transmission system, the system comprising a transmission unit and a reception unit, wherein each of said transmission unit and said reception unit has a dispersion compensation apparatus comprising:

a wave combiner/divider for receiving a plurality of optical signals having different wavelengths, dividing the optical signals into a plurality of first groups, combining the optical signals included in each of the first groups to be outputted as first multiplexed light, receiving a plurality of second multiplexed lights, separating each of the second multiplexed lights, and outputting the optical signals included in the second multiplexed light in each second group, wherein said wave combiner/divider includes input terminals for receiving the optical signals of the first groups and output terminals for outputting the optical signals of the second groups, said input terminals and output terminals being arranged alternately and adjacent to each other; and wherein said wave combiner/divider further includes output terminals for outputting the first multiplexed light and input terminals for receiving the second multiplexed light, said input terminals and output terminals being arranged alternately and adjacent to each other.

13. A dispersion compensation apparatus that performs dispersion compensation in an optical transmission system, the apparatus comprising:

a wave combiner/divider for receiving a plurality of optical signals having different wavelengths, dividing the input optical signals into a plurality of first groups, combining the optical signals included in each of the first groups to be outputted as first multiplexed light, receiving a plurality of second multiplexed lights, separating each of the inputted second multiplexed lights, and outputting a plurality of optical signals included in the plurality of second multiplexed lights in each second group, wherein said wave combiner/divider has input terminals for receiving the optical signals of the plurality of first groups and output terminals for outputting the optical signals of the second groups, wherein said input terminals and output terminals are arranged alternately and adjacent to each other; and wherein said wave combiner/divider further has output terminals for outputting the first multiplexed light and input terminals for receiving the second multiplexed light, wherein said input terminals and output terminals are arranged alternately and adjacent to each other.

14. The dispersion compensation apparatus according to claim 13 further comprising a plurality of dispersion compensation units each of which subjects the corresponding first and second multiplexed lights to compensation for dispersion of predetermined wavelengths.

15. The dispersion compensation apparatus according to claim 13 further comprising optical isolators provided on the following stage of the output terminals for outputting the first multiplexed light and on a previous stage to the input terminals, which receives the second multiplexed light, respectively.

16. A dispersion compensation system that performs dispersion compensation in an optical transmission system, the system comprising a transmission unit and a reception unit, wherein said transmission unit has a dispersion compensation apparatus comprising:

an arrayed waveguide grating incorporating a first wave combiner for receiving a plurality of optical signals having different wavelengths, dividing the input optical signals into a plurality of groups, combining the optical signals included in the plurality of groups based on where the signals are received at the input, and outputting a first multiplexed light in each of the groups; and a second wave combiner for receiving the first multiplexed lights outputted from said first wave combiner, and combining the first multiplexed lights to output a second multiplexed light; and wherein said reception unit has a dispersion compensation apparatus comprising:

a first wave divider for receiving a first multiplexed light including a plurality of optical signals having different wavelengths and grouped based on a multiplexing operation, separating the first multiplexed light into the plurality of groups designated during the multiplexing operation, and outputting a plurality of second multiplexed lights; and a second wave divider for receiving the second multiplexed lights outputted from said first wave divider, separating each of the second multiplexed lights, and outputting the optical signals included in the second multiplexed light.

* * * * *